United States Patent
Vaidyanathan et al.

(10) Patent No.: US 12,542,330 B2
(45) Date of Patent: Feb. 3, 2026

(54) BATTERY SUBASSEMBLY WITH POTTING MATERIAL

(71) Applicant: Rivian IP Holdings, LLC, Irvine, CA (US)

(72) Inventors: Sagar Vaidyanathan, Irvine, CA (US); Kyle Butterfield, Ladera Ranch, CA (US); Nilesh Ashok Kharat, Tustin, CA (US); Akshay Kishor Murkute, Irvine, CA (US); Tyler Jacobs, Hawthorne, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/641,023

(22) Filed: Apr. 19, 2024

(65) Prior Publication Data

US 2025/0007077 A1  Jan. 2, 2025

Related U.S. Application Data

(60) Provisional application No. 63/511,609, filed on Jun. 30, 2023.

(51) Int. Cl.
| | |
|---|---|
| *H01M 50/293* | (2021.01) |
| *H01M 10/613* | (2014.01) |
| *H01M 10/625* | (2014.01) |
| *H01M 10/6554* | (2014.01) |
| *H01M 10/658* | (2014.01) |
| *H01M 50/249* | (2021.01) |
| *H01M 50/264* | (2021.01) |

(52) U.S. Cl.
CPC ....... *H01M 50/293* (2021.01); *H01M 10/613* (2015.04); *H01M 10/625* (2015.04); *H01M 10/6554* (2015.04); *H01M 10/658* (2015.04); *H01M 50/249* (2021.01); *H01M 50/264* (2021.01); *H01M 2220/20* (2013.01)

(58) Field of Classification Search
CPC ............. H01M 50/293; H01M 10/613; H01M 10/625; H01M 10/6554; H01M 10/658; H01M 50/249; H01M 50/264; H01M 2220/20
See application file for complete search history.

(56) References Cited

U.S. PATENT DOCUMENTS

| | | |
|---|---|---|
| 5,495,889 A | 3/1996 | Dubelloy |
| 5,977,859 A | 11/1999 | Kawamura |
| 8,580,428 B2 | 11/2013 | Kiyama |
| 8,897,010 B2 | 11/2014 | Shepard |
| 8,991,478 B2 | 3/2015 | Zaffetti |
| 8,999,548 B2 | 4/2015 | Sun et al. |
| 9,147,875 B1 | 9/2015 | Coakley |
| 9,545,010 B2 | 1/2017 | Coackley et al. |
| 9,568,257 B2 | 2/2017 | Moruzzi |
| 9,844,148 B2 | 12/2017 | Coakley |

(Continued)

FOREIGN PATENT DOCUMENTS

| | | |
|---|---|---|
| FR | 2705085 | 11/1994 |
| WO | WO 2018/174621 | 9/2018 |
| WO | WO 2019/054765 | 9/2019 |

*Primary Examiner* — Michael L Dignan
(74) *Attorney, Agent, or Firm* — BAKERHOSTETLER

(57) ABSTRACT

Aspects of the subject disclosure relate to various features of a battery subassembly, such as a battery module. The battery subassembly may be implemented in an electric vehicle or in a building.

18 Claims, 24 Drawing Sheets

(56) References Cited

U.S. PATENT DOCUMENTS

| | | |
|---|---|---|
| 10,180,289 B2 | 1/2019 | Vanderwees |
| 10,211,443 B2 | 2/2019 | Coackley et al. |
| 10,297,813 B2 | 5/2019 | Takano |
| 10,714,730 B2 | 7/2020 | Tyler et al. |
| 10,964,931 B2 | 3/2021 | Coackley et al. |
| 11,116,070 B2 | 9/2021 | Coakley |
| 11,133,538 B2 | 9/2021 | Ge et al. |
| 11,134,590 B2 | 9/2021 | Wang |
| 11,201,364 B2 | 12/2021 | Kawakami |
| 11,302,997 B2 | 4/2022 | Wynn et al. |
| 11,894,580 B2 | 2/2024 | Coakley |
| 11,979,976 B2 | 5/2024 | Coakley |
| 12,035,459 B2 | 7/2024 | Coakley |
| 12,040,511 B2 | 7/2024 | Coakley |
| 2010/0136388 A1 | 6/2010 | Kim |
| 2011/0008654 A1 | 1/2011 | Kim |
| 2011/0027644 A1 | 2/2011 | Kiyama |
| 2011/0095859 A1 | 4/2011 | Shibata |
| 2012/0003508 A1* | 1/2012 | Narbonne ............ H01M 50/24 429/8 |
| 2012/0107663 A1 | 5/2012 | Burgers |
| 2013/0071720 A1 | 3/2013 | Zahn |
| 2013/0244077 A1 | 9/2013 | Palanchorn |
| 2013/0337291 A1 | 12/2013 | Mayer |
| 2015/0364744 A1 | 12/2015 | Takano |
| 2016/0025428 A1 | 1/2016 | Hendriz |
| 2016/0204486 A1 | 7/2016 | Kenney |
| 2016/0315304 A1 | 10/2016 | Biskup |
| 2016/0315365 A1 | 10/2016 | Vanderwees |
| 2017/0244143 A1 | 8/2017 | Burgers |
| 2017/0256826 A1 | 9/2017 | Hong |
| 2018/0205125 A1 | 7/2018 | Bergers |
| 2018/0252479 A1 | 9/2018 | Kenney |
| 2018/0294449 A1 | 10/2018 | Zeng |
| 2018/0337434 A1 | 11/2018 | Burgers |
| 2018/0375077 A1* | 12/2018 | Shin ...................... H01M 50/20 |
| 2019/0109357 A1 | 4/2019 | Kenney |
| 2019/0366876 A1 | 12/2019 | Cheadle |
| 2020/0067056 A1 | 2/2020 | Wynn et al. |
| 2020/0076022 A1 | 3/2020 | Kawakami |
| 2020/0136205 A1 | 4/2020 | Graves |
| 2020/0185686 A1 | 6/2020 | Ng |
| 2020/0203941 A1 | 6/2020 | Ing |
| 2020/0243934 A1 | 7/2020 | Galvis |
| 2021/0175588 A1 | 6/2021 | Coackley et al. |
| 2021/0226260 A1 | 7/2021 | Moon |
| 2021/0242516 A1 | 8/2021 | Rahim |
| 2021/0247145 A1 | 8/2021 | Vakilimoghaddam |
| 2021/0254895 A1 | 8/2021 | Vakilimoghaddam |
| 2022/0021048 A1 | 1/2022 | Boddakayala |
| 2022/0120518 A1 | 4/2022 | Vanderwees |
| 2022/0123442 A1 | 4/2022 | Zu |
| 2022/0131212 A1 | 4/2022 | Collins |
| 2022/0190445 A1 | 6/2022 | Wynn et al. |
| 2022/0311103 A1 | 9/2022 | Findlay et al. |
| 2022/0320643 A1 | 10/2022 | Su |
| 2022/0336883 A1 | 10/2022 | Galvis |
| 2023/0048125 A1 | 2/2023 | Su |
| 2023/0111495 A1 | 4/2023 | Jung |
| 2023/0118321 A1 | 4/2023 | Fang |
| 2023/0216147 A1* | 7/2023 | Yoon .................. H01M 10/613 429/90 |
| 2023/0335853 A1* | 10/2023 | Davis ................. H01M 50/264 |
| 2023/0378561 A1 | 11/2023 | Totman |
| 2024/0283071 A1* | 8/2024 | Feng ................... H01M 50/258 |

* cited by examiner

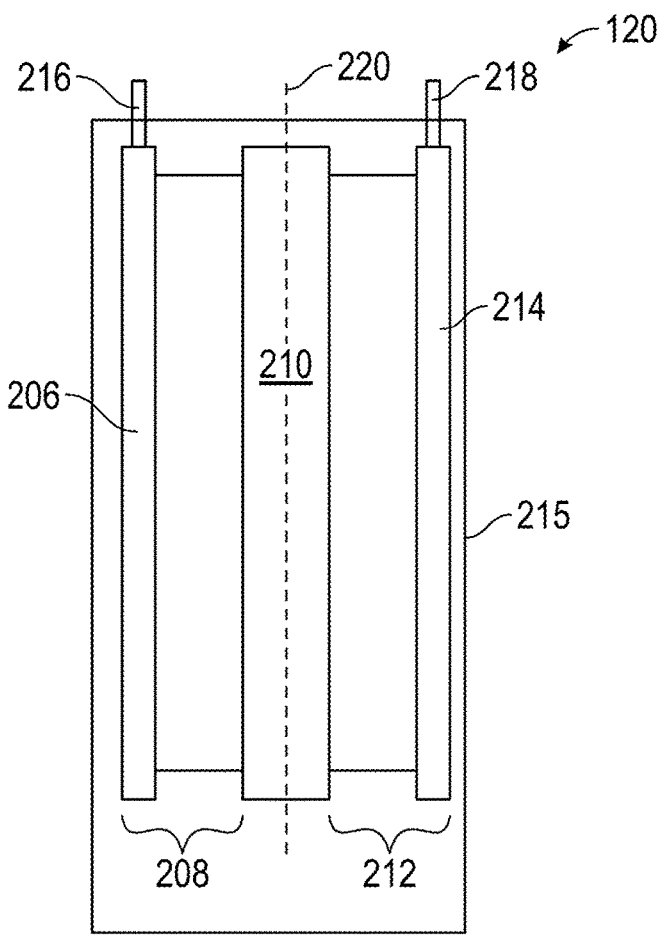
FIG. 2C
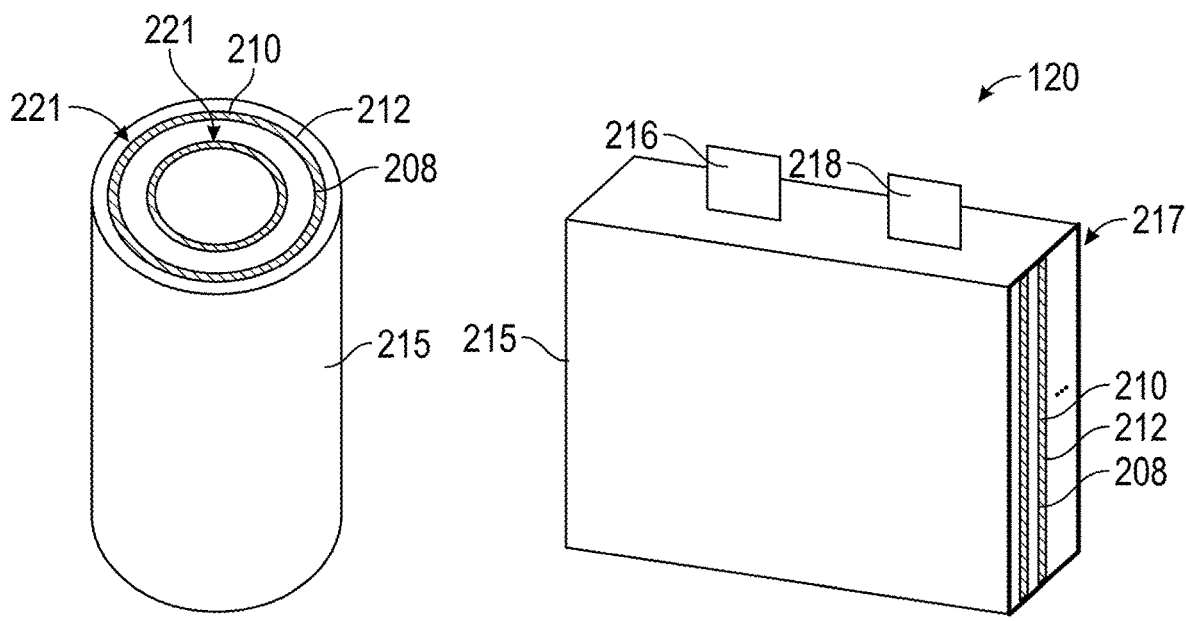
FIG. 2D  FIG. 2E

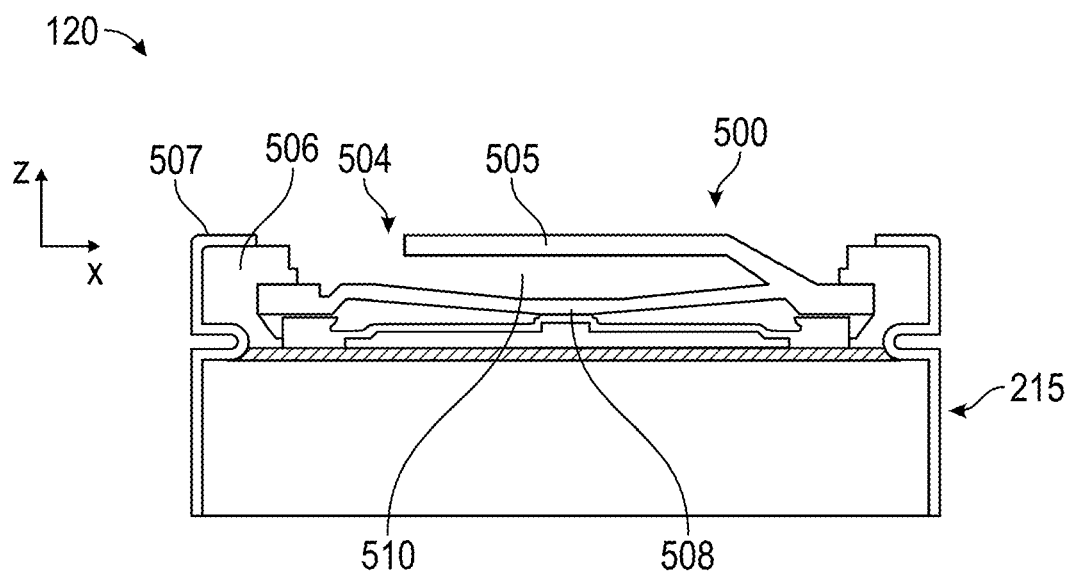
FIG. 5
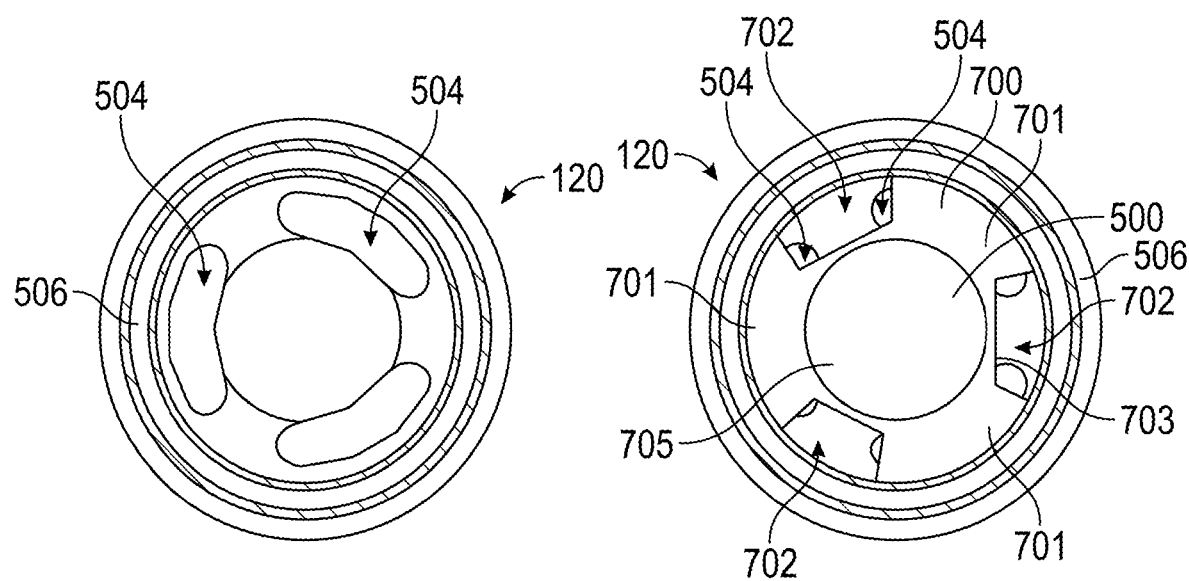
FIG. 6  FIG. 7

BATTERY SUBASSEMBLY WITH POTTING MATERIAL

CROSS REFERENCE TO RELATED APPLICATIONS

This application claims the benefit of priority to U.S. Provisional Patent Application No. 63/511,609, entitled, "Battery Subassembly", filed on Jun. 30, 2023, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the efficient and/or range of electric vehicles, which can help to mitigate climate change by reducing greenhouse gas emissions.

SUMMARY

The present disclosure generally relates to various aspects of a battery module. As examples, aspects of the subject disclosure include features of (i) a mask for battery cells, (ii) a sustainable cover with potting dam features, (iii) cell carrier impact absorption features, (iv) cold plate thermal, alignment, and/or structural features, (v) current collector assembly (CCA) notch features, (vi) CCA welding and/or tab features, and (vii) cell-to-cold plate and cell-to-cell carrier features.

In accordance with aspects of the disclosure, an apparatus is provided that includes a cell carrier for a plurality of battery cells. The cell carrier may include a portion that defines an arrangement of a plurality of openings, each configured to receive a battery cell. The portion of cell carrier may be configured to secure a lower portion of each battery cell within a corresponding one of the openings, to allow an upper portion of each battery cell to be contacted by a potting material that extends between adjacent battery cells and from a top height of the battery cells to the portion of the cell carrier. The apparatus may also include a first adhesive that attaches the portion of the cell carrier to the battery cells. The first adhesive may include a polyurethane. The potting material may include the polyurethane and a plurality of micro-balloons.

The apparatus may also include a cold plate and a second adhesive, different from the first adhesive, that attaches a bottom surface of each of the battery cells to the cold plate. The second adhesive may include a thermally conductive adhesive. The second adhesive may include a double-sided adhesive tape that substantially covers a surface of the cold plate. The lower portion of each battery cell may include a portion of the battery cell that extends from a bottom of the battery cell to a location less than halfway to a top of the battery cell. The lower portion of each battery cell may include a portion of the battery cell that extends from a bottom of the battery cell to a location less than a quarter of a distance to a top of the battery cell. The portion of the cell carrier may include a crate structure of the cell carrier.

In accordance with other aspects of the disclosure, an apparatus may be provided that includes a battery subassembly, the battery subassembly including: a cell carrier for a plurality of battery cells. The cell carrier may include a crate structure having a plurality of openings, each configured to receive a battery cell. The crate structure may be configured to secure a lower portion of each battery cell to allow an upper portion of each battery cell to be contacted by a potting material that extends between adjacent battery cells and from a top height of the battery cells to the crate structure. The battery subassembly may also include the plurality of battery cells each having the lower portion thereof secured to the crate structure by a first adhesive. The battery subassembly may also include the potting material extending between adjacent battery cells and from a top height of the battery cells to the crate structure. The first adhesive may include a polyurethane and the potting material may include the polyurethane and a plurality of micro-balloons. The first adhesive and the crate structure may prevent the potting material from flowing into contact with the lower portion of each of the battery cells. The apparatus may include a vehicle that includes the battery subassembly. The vehicle may include a battery pack including the battery subassembly and a plurality of additional battery subassemblies.

In accordance with other aspects of the disclosure, an electric vehicle may be provided that includes a battery pack including one or more battery subassemblies, each of the one or more battery subassemblies including a cell carrier for a plurality of battery cells. The cell carrier may include a crate structure having a plurality of openings, each configured to receive a battery cell. The crate structure may be configured to secure a lower portion of each battery cell to allow an upper portion of each battery cell to be contacted by a potting material that extends between adjacent battery cells and from a top height of the battery cells to the crate structure.

In accordance with other aspects of the disclosure, a method, may be provided that includes inserting a plurality of battery cells into a cell carrier; attaching a lower end of each of the plurality of battery cells into a crate structure of the cell carrier using a first adhesive; and providing a potting material into a plurality of spaces between the battery cells of the plurality of battery cells such that the potting material contacts the battery cells and the crate structure. The method may also include attaching a cold plate to a bottom of each of the plurality of battery cells using a second adhesive different from the first adhesive. The second adhesive may include a thermally conductive adhesive that conducts heat between the battery cells and the cold plate.

BRIEF DESCRIPTION OF THE DRAWINGS

Certain features of the subject technology are set forth in the appended claims. However, for purpose of explanation, several embodiments of the subject technology are set forth in the following figures.

FIG. 2C illustrates a cross-sectional end view of a battery cell in accordance with one or more implementations.

FIG. 2D illustrates a cross-sectional perspective view of a cylindrical battery cell in accordance with one or more implementations.

FIG. 2E illustrates a cross-sectional perspective view of a prismatic battery cell in accordance with one or more implementations.

FIG. 5 illustrates a portion of an example battery cell in accordance with one or more implementations.

FIG. 6 illustrates an top view of an example battery cell in accordance with one or more implementations.

FIG. 7 illustrates an example mask mounted to a battery cell in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a battery module. The battery module may include battery cells. The battery module may be implemented in a battery pack that includes multiple battery modules. The battery module may be implemented in an electric vehicle or other movable apparatus, and/or as a power source for a building or other stationary apparatus. Further details of various aspects of a battery module are described hereinafter.

Figure 1A:
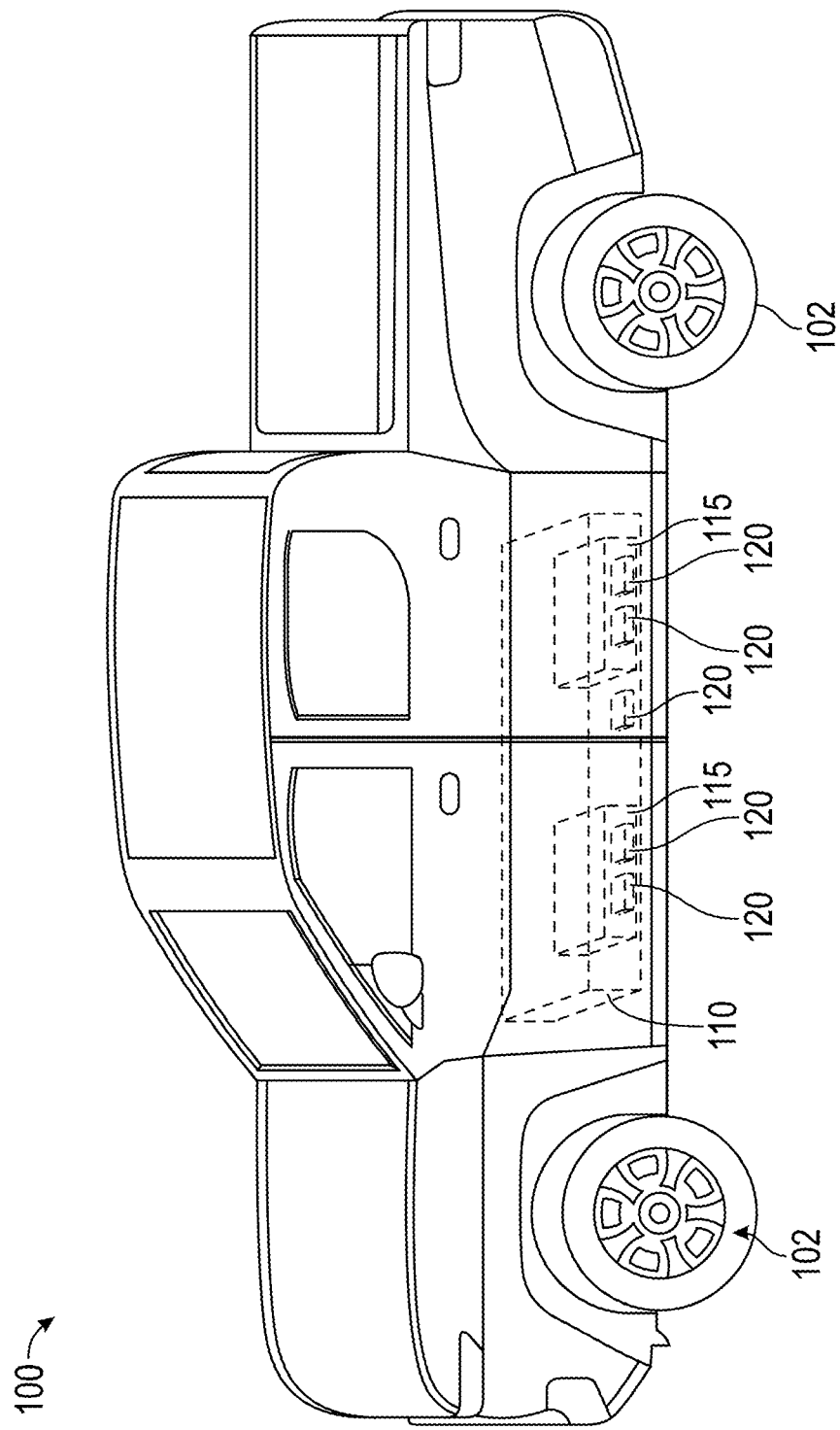
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery subassemblies, for example battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery subassembly, unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
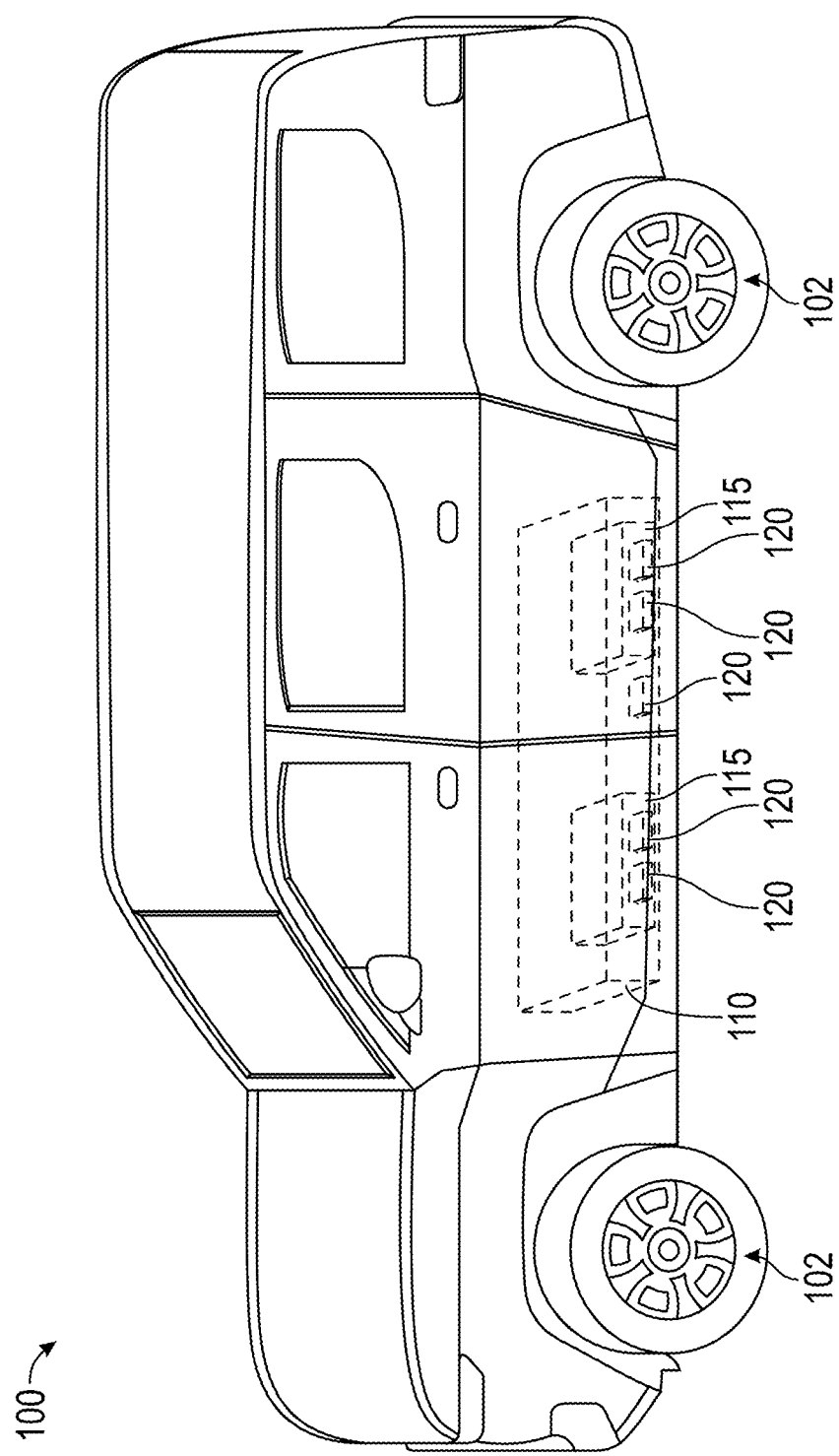

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
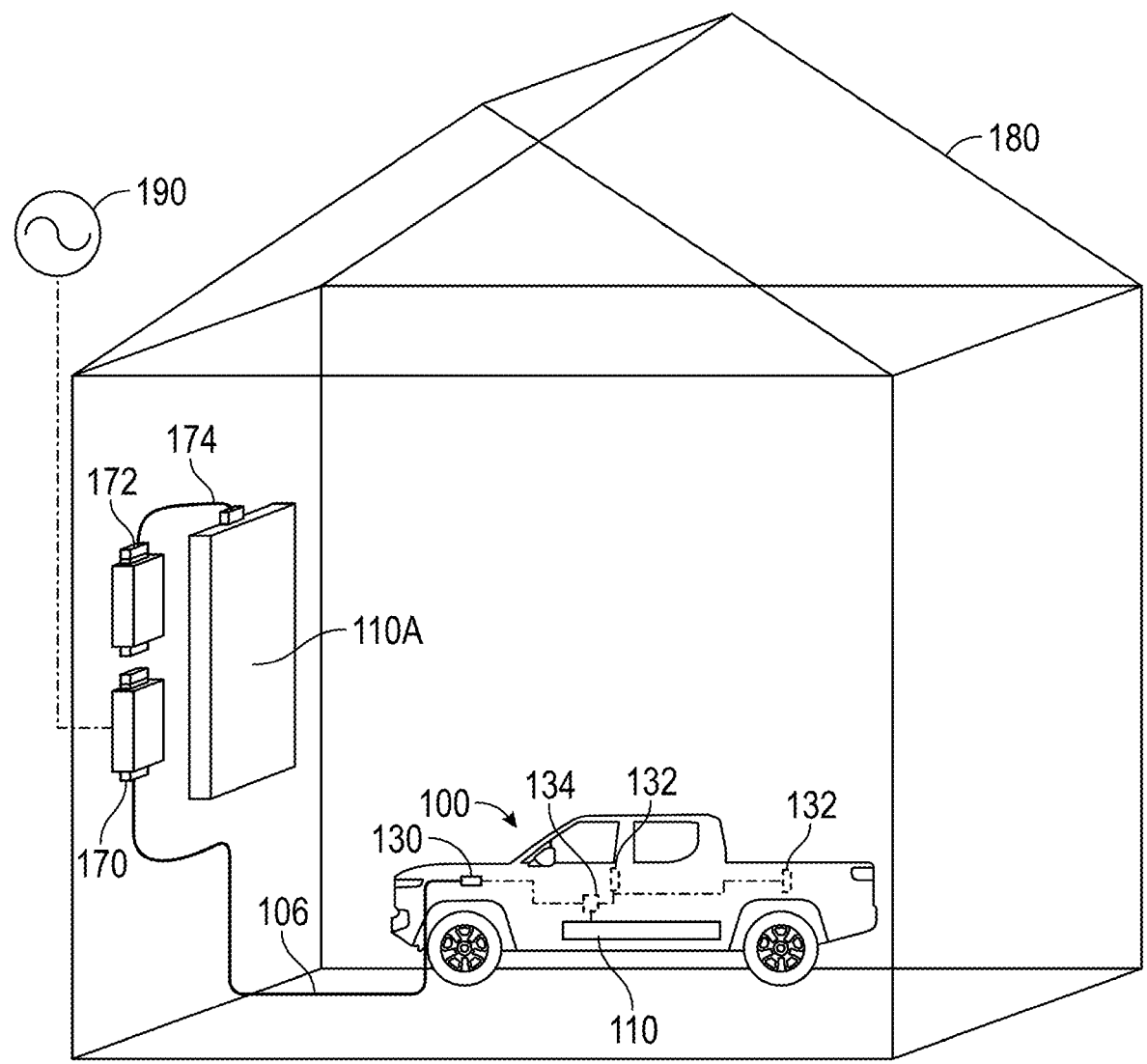
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
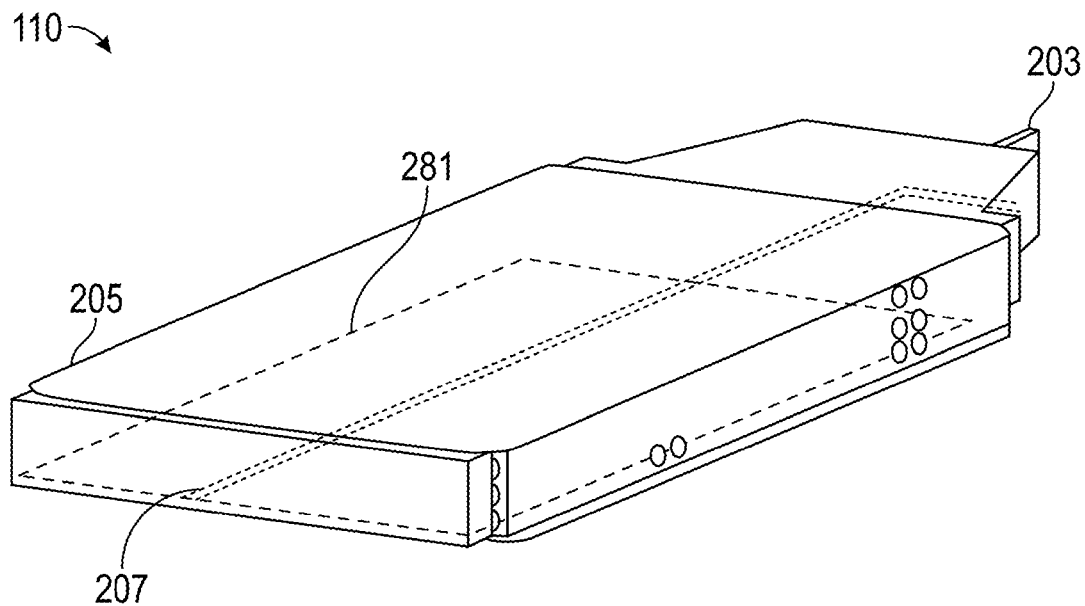
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the battery pack frame 205. For example, a thermal component 281 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
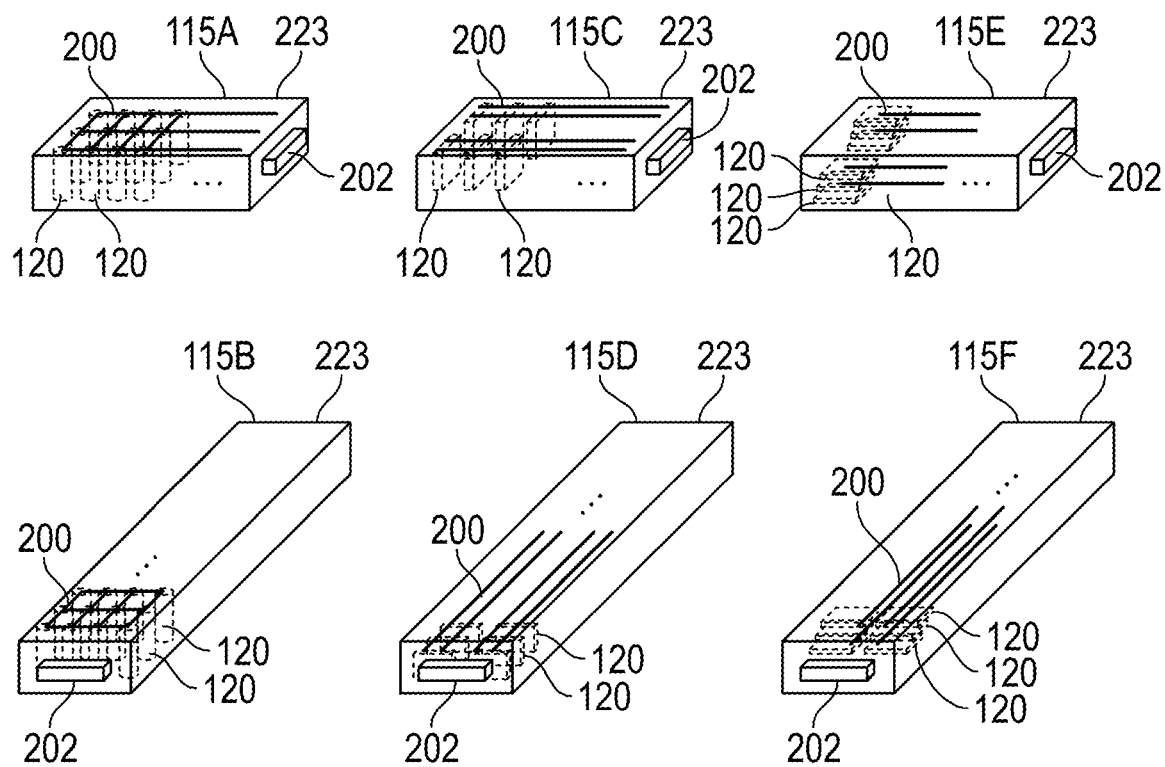
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
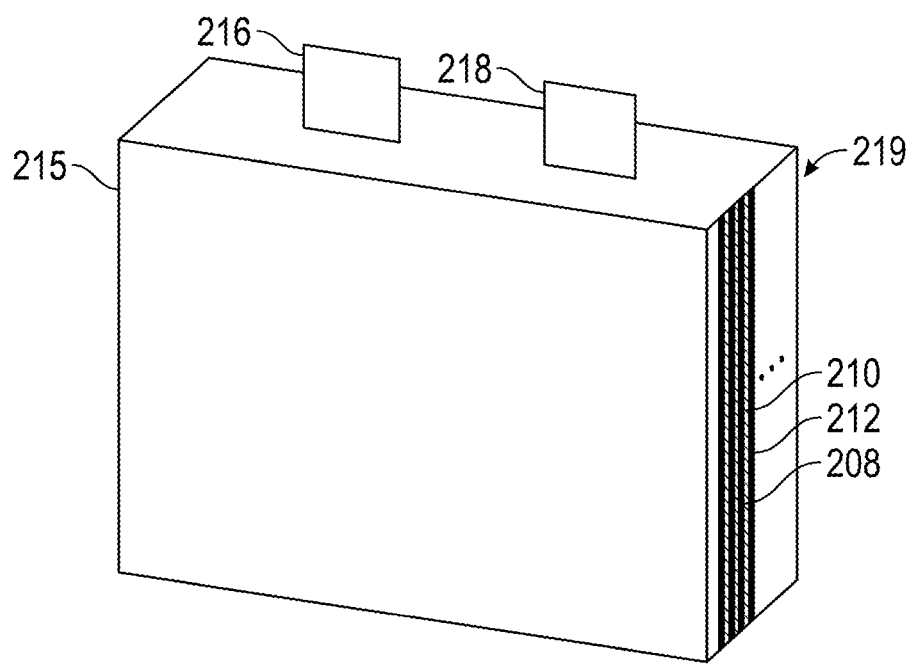
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
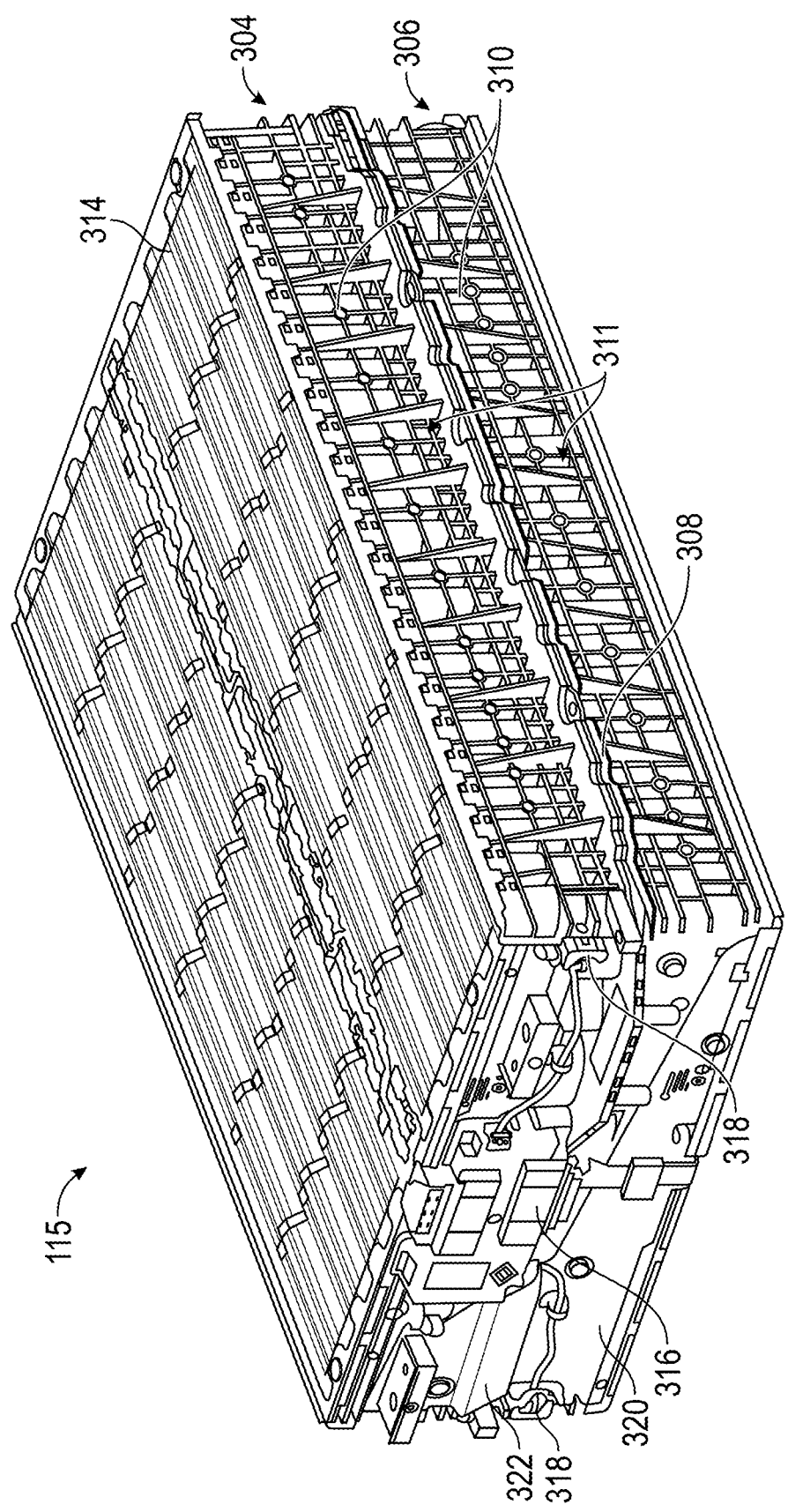
FIG. 3 illustrates a perspective view of a battery module in accordance with one or more implementations.

FIG. 3 illustrates a perspective view of a battery module in accordance with one or more implementations. In the example of FIG. 3, the battery module 115 includes a top submodule 304 and a bottom submodule 306. As shown, each of the top submodule 304 and the bottom submodule 306 may include a cell carrier 310. In one or more implementations, each cell carrier 310 may be a monolithic unitary body (e.g., a molded body formed from plastic and/or other materials), and may include structural features 311 along the sidewalls thereof. These structural features 311 may reinforce the strength of the sidewalls of the carrier, and thereby reduce or eliminate the need for additional structural reinforcing components for the battery module 115, such as shear walls attached to the cell carriers 310. Also visible in FIG. 3 is a cold plate 308 that is disposed between the top submodule 304 and the bottom submodule 306. The cold plate 308 may be in thermal contact with battery cells (not visible in FIG. 3) in the top submodule 304 and battery cells (not visible in FIG. 3) in the bottom submodule 306, to provide thermal control for both the top submodule 304 and the bottom submodule 306.

FIG. 3 also illustrates a cover 314 that may be disposed on a top and/or a bottom of the battery module 115. FIG. 3 also illustrates a balancing voltage and temperature (BVT) module 316 to which multiple thermistor assemblies 318 are communicatively coupled. The BVT can be a modular assembly of various electrical components to monitor or control components of the battery subassembly. For example, the BVT can include a circuit board that is attached to the housing of the BVT. The BVT can have various connectors to couple with, for example, a thermistor that can measure a temperature of the battery subassembly, battery module and/or a battery cell thereof, a voltage sensor or balancer that can sense or control voltage that flows through the battery subassembly, battery module and/or a battery cell thereof, or a communication device that can receive, transmit, or analyze data associated with the battery subassembly, battery module and/or a battery cell thereof. Also shown in FIG. 3 are a busbar 320 (e.g., a positive busbar) that is electrically coupled to first terminals (e.g., the positive terminals) of the battery cells of the top submodule 304 and the bottom submodule 306, and a busbar 322 (e.g., a negative busbar) that is electrically coupled to second terminals (e.g., the negative terminals) of the battery cells of the top submodule 304 and the bottom submodule 306.

Figure 4:
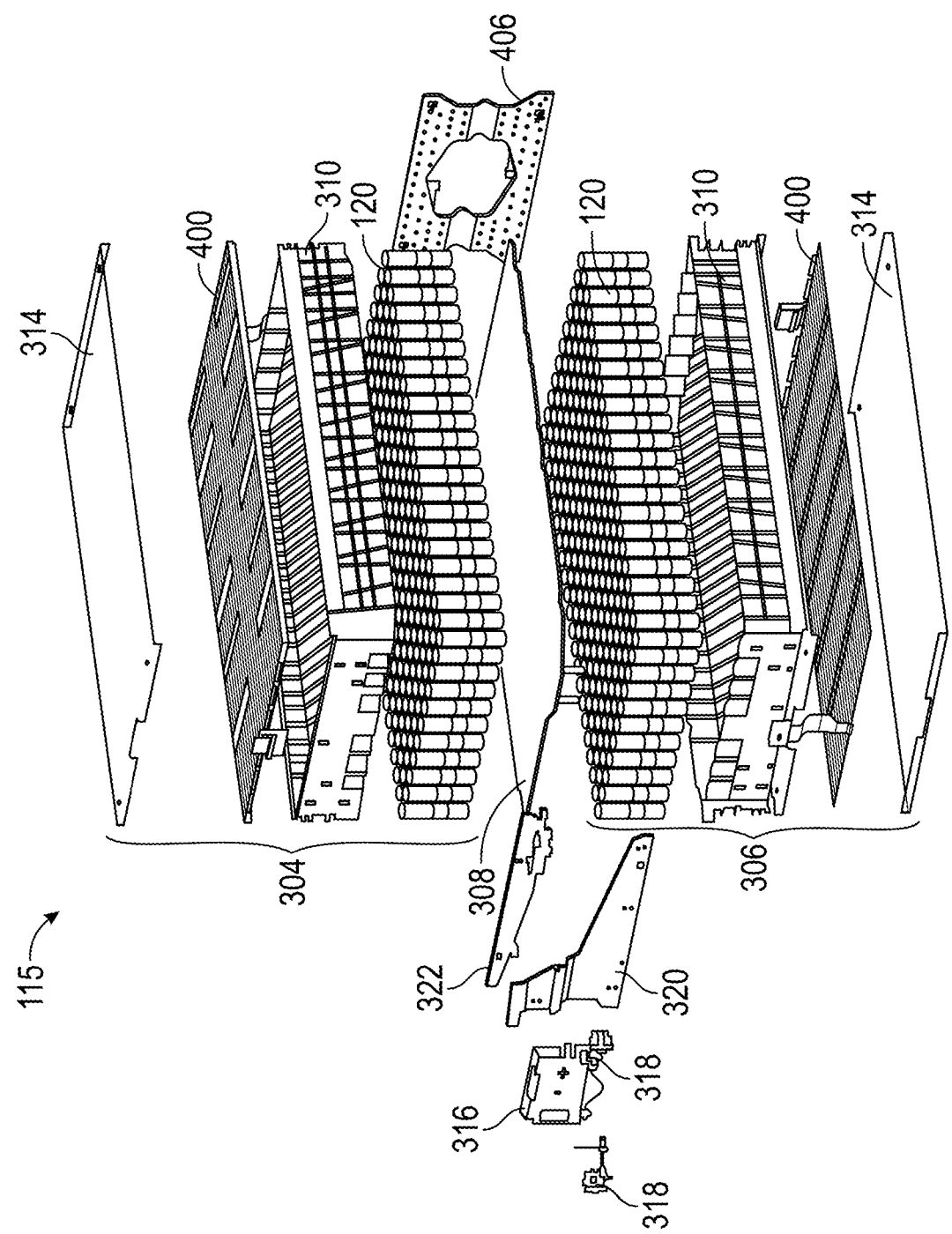
FIG. 4 illustrates an exploded perspective view of the battery module of FIG. 3 in accordance with one or more implementations.

FIG. 4 illustrates an exploded perspective view of the battery module 115 of FIG. 3, in which the battery cells 120 of the top submodule 304 and the battery cells 120 of the bottom submodule 306 can be seen. In one or more examples described herein, the battery module 115, a subset of the components of the battery module 115 (e.g., the top submodule 304, the bottom submodule 306, and/or another subset of the components of the battery module) shown in FIG. 3 and/or FIG. 4, or any other grouping of battery cells (e.g., including a battery pack that includes multiple battery modules and/or other battery subassemblies) may be referred to as a battery subassembly.

In the example of FIG. 4, two current collector assemblies (CCAs) 400 are also visible which, when the battery module 115 is assembled, connect the terminals of the battery cells 120 of the top submodule 304 and the bottom submodule 306 to the busbar 320 and the busbar 322. As shown in FIG. 4, a series busbar 406 may also be provided (e.g., on an opposing end of the cell carriers 310 from the end of the cell carriers at which the busbar 320 and the busbar 322 are mounted). For example, the series busbar 406 may electrically couple the battery cells 120 of the top submodule 304 to the battery cells 120 of the bottom submodule 306. As shown, a cover 314 may be provided for the top submodule 304 and a cover 314 may be provided for the bottom submodule 306.

As discussed in further detail hereinafter, the battery cells 120 of the top submodule 304 may be inserted into a crate structure formed by the cell carrier 310 of the top submodule 304, and the battery cells 120 of the bottom submodule 306 may be inserted into a crate structure formed by the cell carrier 310 of the bottom submodule 306. As shown in FIGS. 3 and 4, the orientation of the cell carrier 310 and the battery cells 120 of the top submodule 304 may be substantially opposite (e.g., upside down with respect) to the orientation of the cell carrier 310 and the battery cells 120 of the bottom submodule 306. In this way, the single cold plate 308 can be in thermal contact with the same ends (e.g., bottom ends) of the battery cells 120 of both the top and bottom submodules, and provide substantially symmetric thermal contact with the top and bottom submodules.

FIG. 5 illustrates a cross-sectional view of a portion of an example battery cell in accordance with one or more implementations. In the example of FIG. 5, the battery cell 120 includes a terminal structure 500. For example, the terminal structure 500 may include a terminal contact 505 that is electrically coupled to one or more electrodes (e.g., positive electrodes, such as cathode 212 of FIG. 2C) within the cell housing 215. As shown, the terminal structure 500 may be formed over a corresponding current interrupt device (CID) 508 for the battery cell 120. For example, the terminal contact 505 may be coupled to the electrode(s) within the cell housing 215 via the CID 508. The CID 508 may be formed as a part of the terminal structure 500 or may be a separate component from the terminal structure 500. In one or more implementations, the terminal structure 500 may form an enclosure member or a cap for the battery cell that, together with the cell housing 215 (e.g., a can), sealingly encloses the electrodes and the electrolyte of the battery cell. In one or more implementations, a peripheral rim 507 of the battery cell 120 may form another terminal contact (e.g., a negative terminal) that may be electrically coupled to one or more other electrodes (e.g., negative electrodes, such as anode 208) within the cell housing 215. The peripheral rim 507 may be electrically insulated from the terminal contact 505, and may be formed as a portion of the terminal structure 500 or may be a separate structure that is attached to the cell housing 215.

As shown, the terminal structure 500 may include one or more openings 504. For example, the openings 504 may be cutouts in the terminal structure 500 (e.g., cutouts in a cap of the battery cell 120). For example, the openings 504 may be arranged to allow a gas to flow out of the battery cell via the CID 508 when the CID 508 is triggered. For example, responsive to a pressure from within the battery cell, the CID 508 may be pressed upward (e.g., in the "y" direction of FIG. 5) into a cavity 510 between the CID 508 and the terminal structure 500, to disengage the terminal structure 500 from the electrodes to break the electrical circuit of the battery cell 120. In one or more implementations, the CID 508, when pressed upward into the cavity 510, may also mechanically break or otherwise open a venting pathway that allows a gas from within the battery cell 120 to be vented to, and through, the openings 504 in some situations (e.g., in the presence of an increase in pressure within the battery cell housing).

FIG. 6 illustrates a top view of the battery cell 120 of FIG. 5, showing a view of the openings 504. In the example of FIGS. 5 and 6, a gasket 506 is also shown. In one or more implementations, the gasket may be provided with a color (e.g., black, yellow, or orange) that is configured to be recognized by locating equipment of assembly equipment for the battery module 115. In this way, the gasket 506 can perform a gasket function and a reference index function for the battery cells.

In the example of FIG. 6, it can be seen that the openings 504 are open from the top of the battery cell 120. The battery module 115, or another battery subassembly in which the battery cells 120 are disposed, may be provided with a potting material that substantially fills the spaces between the battery cells 120 (e.g., to provide structural support and/or thermal coupling to the battery cells). During the assembly process for a battery module 115, the potting material may be disposed or poured onto the battery module in a liquid form. Some of the potting material may inadvertently flow into cavity 510 via the openings 504. Potting material in the cavity 510 can prevent the CID 508 from moving upward into the cavity 510, which can affect the ability of the CID to function to disconnect the battery circuit within the battery cell and to vent gasses from the battery cells.

FIG. 7 illustrates how, in one or more implementations, a mask 700 may be provided for a battery cell 120. For example, the mask 700 may be configured to be mounted to the terminal structure 500 of the battery cell 120. As shown, the mask 700 may include at least one blocking structure 701. The blocking structure 701 may be configured to be mounted over an opening 504 in the terminal structure 500 of the battery cell 120. For example, the mask may prevent a liquid (e.g., a potting material) from flowing into the opening 504, and to allow a gas to flow between the opening 504 in the terminal structure 500 of the battery cell 120 and an environment external to the mask 700.

For example, as shown in FIG. 7, the mask 700 may include multiple blocking structures 701, configured to be mounted over multiple corresponding openings 504 in the terminal structure 500 of the battery cell 120. As shown, the mask 700 may also include a bridge structure 703. As shown, the blocking structures 701 may extend radially outward from the bridge structure 703. The bridge structure 703 may define a central opening 705 configured to be mounted over the terminal structure 500 of the battery cell 120 (e.g., over a central portion of the terminal structure 500 that forms a positive terminal for the battery cell). For example, the bridge structure 703 may extend around the periphery of the central opening 705 and interconnect the blocking structures 701. In one or more implementations, the bridge structure 703 may be adhesively attached to the terminal structure 500 to hold the mask in place on the cap of the battery cell 120. In one or more implementations, the bridge structure 703 may attach to the terminal structure 500 via a snap fit or a press fit to hold the mask in place on the cap of the battery cell 120.

As shown in FIG. 7, the mask 700 may also include one or more peripheral openings 702. For example, each of the peripheral openings 702 may be disposed between a pair of blocking structures 701. In one or more implementations, each of the peripheral openings 702 may be configured (e.g., sized, shaped, and/or positioned) to allow gas to flow therethrough (e.g., to allow air to flow into the openings 504 and/or gas from the battery cell to pass out through the openings 504 and the peripheral openings 702) and to prevent the liquid (e.g., potting material) from flowing therethrough (e.g., into the openings 504). For example, each of the peripheral openings 702 may extend over a portion of an opening 504 in the cap of the battery cell. For example, the one or more openings 504 and/or one or more peripheral openings 702 may form a vent for a current interrupt device (CID) (508) of the battery cell 120.

In one or more implementations, the mask 700 may be formed from a flexible material. As examples, the flexible material may include a polymer (e.g., polyethylene terephthalate (PET)) or a rubber. As discussed herein, in one or more implementations, the mask 700 and the battery cell 120 (e.g., to which the mask 700 is mounted) may be implemented in a vehicle (e.g., vehicle 100, such as in a battery module 115 of a battery pack 110 within an electric vehicle). As discussed herein, in one or more implementations, the mask 700 and the battery cell 120 (e.g., to which the mask 700 is mounted) may be implemented in a building (e.g., building 180, such as in a battery module 115 of a battery pack 110 within a building).

In one or more other implementations, a mask for a battery cell may include a bridge structure at the outer periphery of the mask, and blocking structures that extend radially inward from the bridge structure. In this example, the blocking structures may each be configured to tuck into a corresponding one of the openings 504 in the terminal structure 500 of the battery cell 120. In this way, the mask may be mechanically attached to the terminal structure 500 of the battery cell 120 via the tucking of the blocking structures into the openings. Once tucked into the openings 504, the blocking structures may block a liquid, such as potting material, from flowing through the openings 504 into the cavity 510

Figure 8:
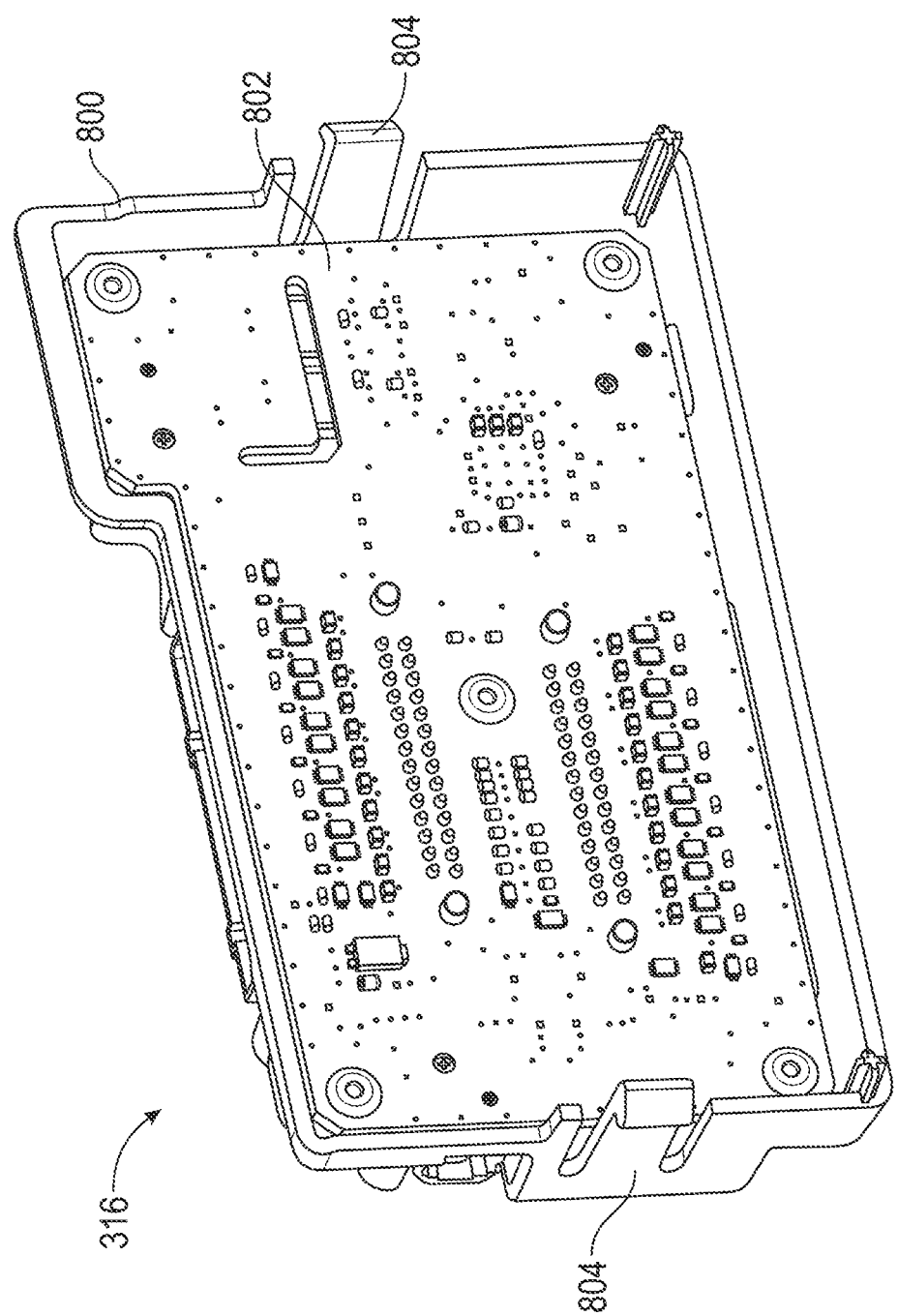
FIG. 8 illustrates a rear perspective view of a balancing voltage and temperature (BVT) module for a battery module in accordance with one or more implementations.

FIG. 8 illustrates a rear perspective view of a balancing voltage and temperature (BVT) module for a battery module in accordance with one or more implementations. As shown in FIG. 8, the BVT module 316 may be provided with a housing 800 within which a printed circuit board 802 is disposed. For example, the printed circuit board may be a dual-sided printed circuit board (e.g., with circuitry, such as integrated circuits, transistors, capacitors, inductors, and/or the like mounted to both sides of the printed circuit board). The circuit board 802 can be disposed in the cavity of the housing 800. The circuit board 802 can be coupled with the housing 800 via heat staking. FIG. 8 also shows how the housing 800 of the BVT module 316 may include mounting features 804 for mounting the BVT module 316 to the battery module 115. For example, the mounting features 804 may be implemented as snap features as shown in FIG. 8. In one or more implementations, the mounting features 804 may be received in one or more openings in a cell carrier 310 and/or a busbar, such as the busbar 322 or the busbar 320 of FIGS. 3 and 4.

Figure 9A:
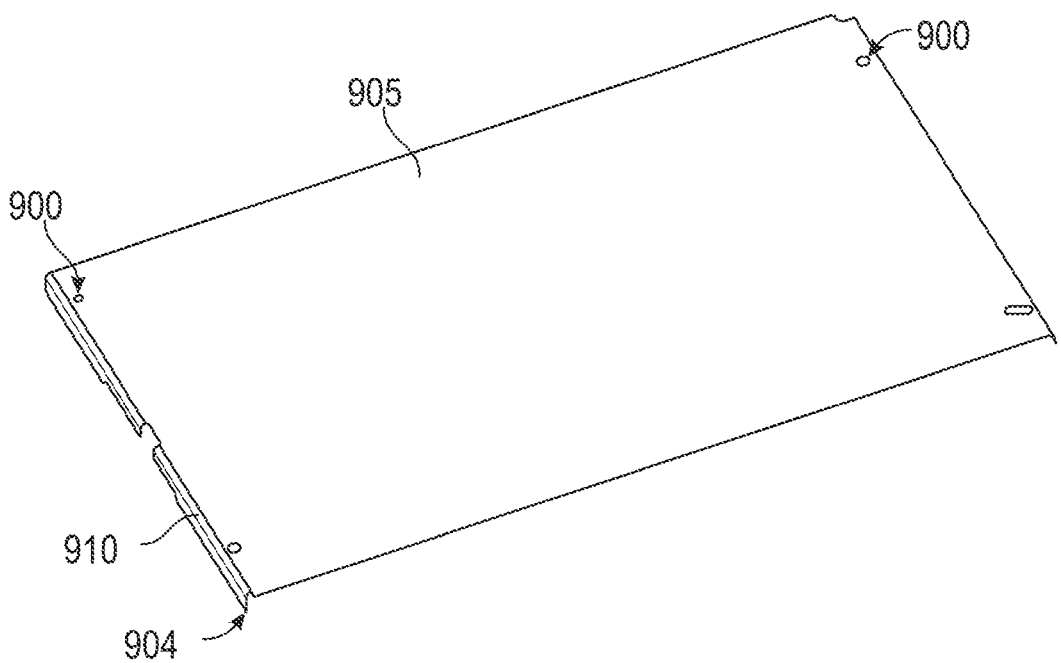
FIG. 9A illustrates a perspective view of a cover for a battery module in accordance with one or more implementations.

FIG. 9A illustrates a perspective view of a cover 314 for a battery module in accordance with one or more implementations. As shown in FIG. 9A, the cover 314 may include substantially planar main structure 905 that is configured to cover the electrical components of the battery module 115. As shown, the cover 314 may include one or more attachment features 900 configured to allow an edge portion 910 of the cover 314 to be fixed to another structure of the battery module 115 (e.g., to the cell carrier 310). As shown in FIG. 9A, the edge portion 910 of the cover 314 may include an overhang 904. For example, the overhang 904 may be configured to curve over an outer edge of a cell carrier 310 in one or more implementations.

Figure 9B:
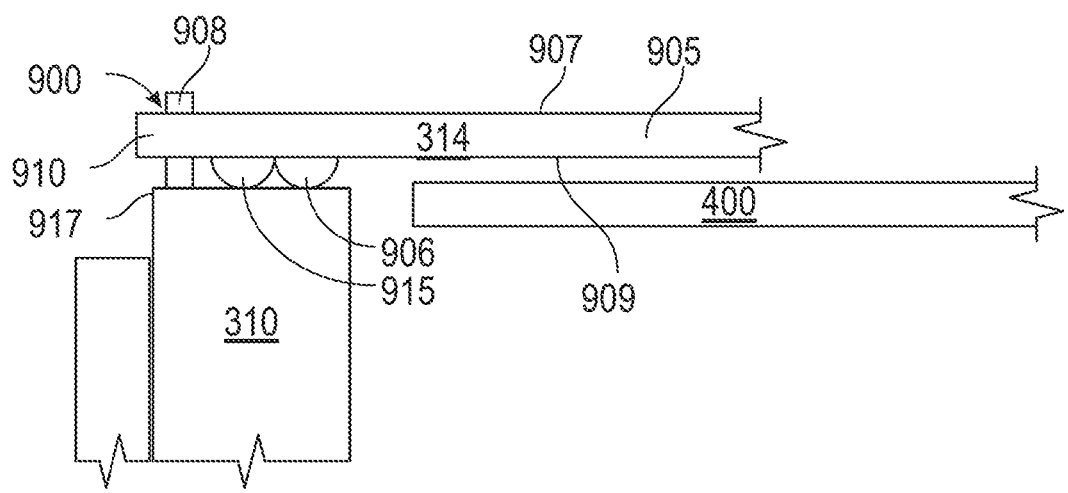
FIG. 9B illustrates a cross-sectional view of a portion of a battery module including a cover in accordance with one or more implementations.

In one or more implementations, the attachment features 900 may include an opening. For example, FIG. 9B illustrates a cross-sectional view of a portion of a battery module including a cover 314 in accordance with one or more implementations. As shown in the cross-sectional side view of FIG. 9B, the opening may be configured to receive a fastener 908 therethrough. As examples, the fastener 908 may be a pin, a screw, or other fastening member. As shown in FIG. 9B, the fastener 908 may pass through the opening and into a portion of the cell carrier 310.

As shown, the cover 314 (e.g., for a battery module 115) may include a substantially planar main structure 905 configured to cover an electrical structure (e.g., CCA 400) of the battery module. The substantially planar main structure 905 may include an outer surface 907 and an opposing inner surface 909 that is configured to face the electrical structure of the battery module. The cover 314 may also include a sealing feature 906 that protrudes from the inner surface 909 of the substantially planar main structure 905. For example, the sealing feature 906 may run around at least a portion of a periphery of the substantially planar main structure 905 (e.g., around the entire periphery of the substantially planar main structure, along one, two, three, or four edges of the substantially planar main structure, or around another portion of the substantially planar main structure).

As shown, the sealing feature 906 may be configured to sealingly interface with a peripheral surface 915 of the battery subassembly (e.g., a peripheral surface of a cell carrier 310) to impede or prevent a liquid, such as a potting material, from passing between the cell carrier 310 and the cover 314. For example, the cover 314 may be placed over the CCA 400 and attached to the cell carrier 310 before a potting material is injected into the cell carrier 310 in the spaces between the battery cells 120 therein. In the arrangement of FIG. 9B, the cover 314 (e.g., including the sealing feature 906) may act as a potting dam to prevent leakage of the potting material during injection. Resultingly, in some implementations, the battery module 115 may include potting material in contact with the sealing features 906 of the cover 314.

In one or more implementations, the edge portion 910 of the substantially planar main structure 905 extends beyond the sealing feature 906 and includes an attachment feature 900 (configured to allow the edge portion 910 to be fixed to the cell carrier 310. As discussed herein, the attachment feature 900 may include an opening that is configured to receive a fastener 908 therethrough. As discussed herein, the edge portion 910 of the cover 314 may also include an overhang 904 configured to curve over an outer edge 917 of the cell carrier 310. In various implementations, the sealing feature 906 may be attached to the inner surface 909 of the cover 314 or may be an integral feature of the cover 314 (e.g., a protruding portion of a unitary structure forming the cover). In one or more implementations, the cover 314 may be a sustainable cover and may be formed from a material at least twenty-five percent, fifty percent, seventy percent, or seventy-five percent of which is a recycled polymer material. For example, the cover 314 may be formed from a thermoplastic (e.g., polyethylene terephthalate (PET)) and/or a recycled thermoplastic (e.g., rPET).

Figure 10:
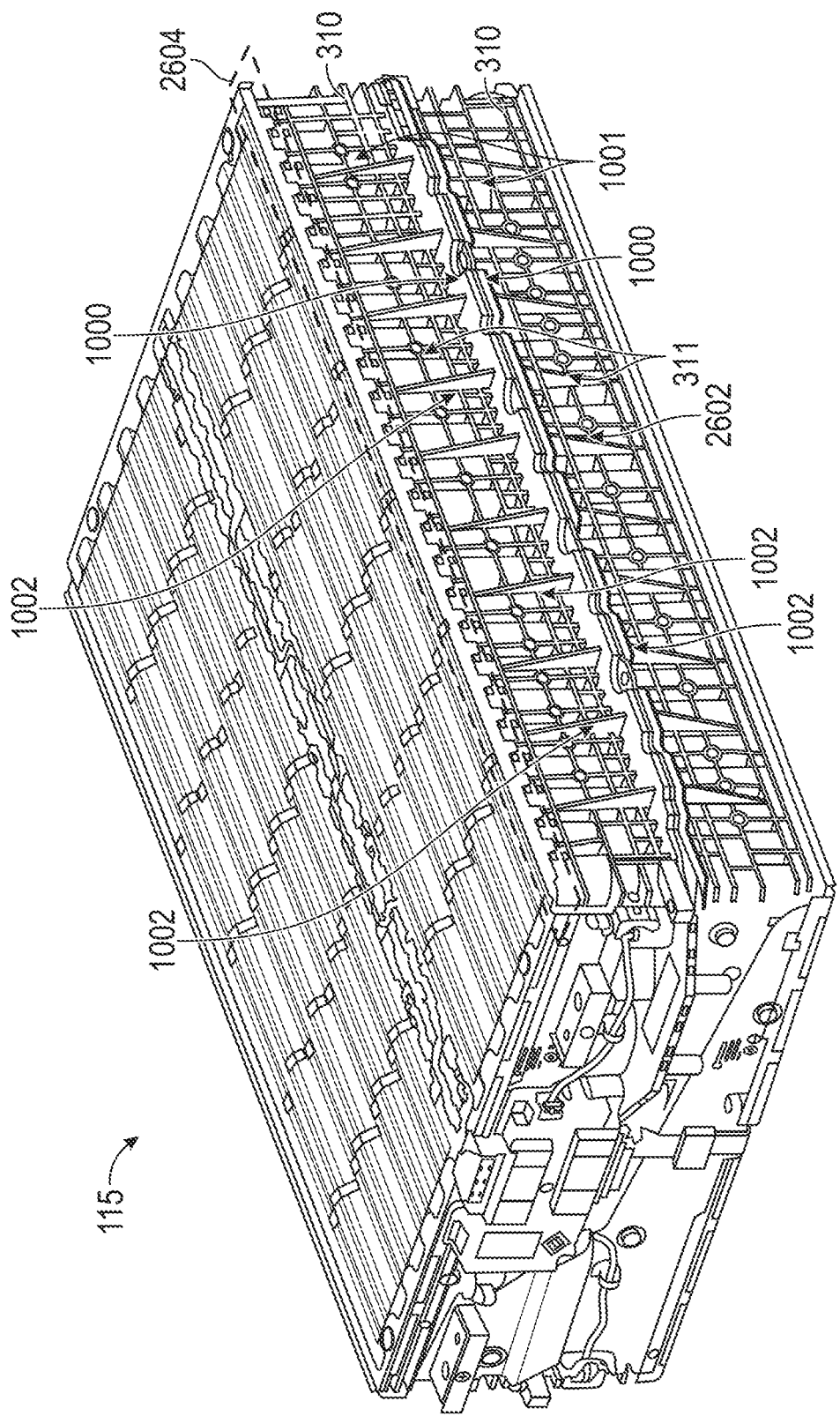
FIG. 10 illustrates a perspective view of a battery module showing features of a cell carrier for a battery module in accordance with one or more implementations.

FIG. 10 illustrates a perspective view a battery module 115 in which various feature of the cell carriers 310 can be seen, in accordance with one or more implementations. In the example of FIG. 10, each cell carrier 310 (e.g., configured to receive and carry battery cells 120) may include a sidewall 1001. As shown, each of the sidewalls 1001 may include structural features 311. For example, the structural features 311 may include ribs 1002 that extend outward from an exterior of the sidewall 1001. For example, ribs 1002 may be configured to distribute at least a portion of an impact force on the cell carrier 310 (e.g., due to an impact to the battery pack 110, such as due to a vehicle collision) away from the battery cells carried by the cell carrier 310.

In one or more implementations, the sidewalls 1001 and ribs 1002 of each cell carrier 310 may be integrally formed parts of a common unitary structure (e.g., the cell carrier 310). As shown in the example of FIG. 10, one or more of the ribs 1002 may be implemented as a gusset that extends perpendicularly from the sidewall 1001 to a flange 1000 that extends outward from a base of the sidewall 1001 perpendicularly to the sidewall 1001 and to each of the ribs 1002. In one or more implementations, the flange 1000 may be another integrally formed part of the common unitary structure (e.g., the cell carrier 310).

In the example of FIG. 10, each of the ribs 1002 extends from a corresponding sidewall 1001 to a first distance at a corresponding flange 1000, and tapers, moving vertically away from the corresponding flange 1000, toward the corresponding sidewall 1001.

Figure 11:
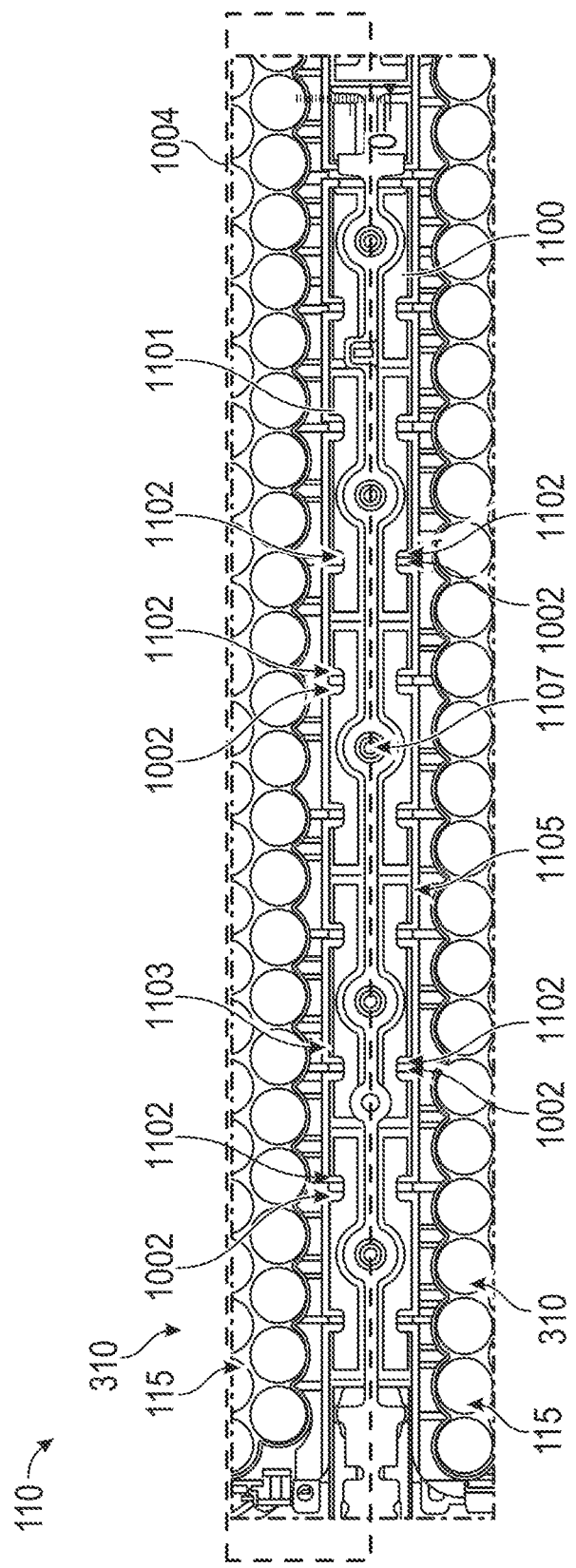
FIG. 11 illustrates a top view of a portion of a battery pack including battery modules in accordance with one or more implementations.

FIG. 11 illustrates a top view of a portion of a battery pack having two battery modules 115 that are laterally (e.g., horizontally) separated from each other. For example, FIG. 11 may represent a top-down view of a portion of the battery module 115 of FIG. 10 in the dashed box 1004, and a similar portion of another battery module 115.

As shown in FIG. 11, the ribs 1002 on a sidewall 1001 of a cell carrier 310 may be configured to be received by corresponding notches 1102 in a cross member 1100 disposed between the cell carrier 310 and another cell carrier 310. In this arrangement, the ribs 1002 may be configured to distribute at least some of the portion of an impact force to the cross member 1100. In this way, an impact force of an impact to the battery pack and/or battery modules may be redirected away from the battery cells 120 stored in the cell carriers 310, and absorbed by the cross member 1100.

In the examples of FIGS. 10 and 11, only one side of each cell carrier is visible. However, it is appreciated that the sidewalls 1001 shown in FIG. 10 may each be a first sidewall 1001 on a first side of a corresponding cell carrier 310, each cell carrier 310 may include a second sidewall 1001 on an opposing second side of the cell carrier 310, and the second sidewall 1001 may include an additional ribs 1002 that extend outward from an exterior of the second sidewall 1001. For example, in the example of FIG. 11, the ribs 1002 of a first sidewall of one cell carrier 310 may be opposed to the ribs 1002 of a second sidewall of another cell carrier 310 (e.g., with the cross member 1100 interposed therebetween).

As shown in FIG. 11, a cross member 1100 for a battery pack 110 may an elongate main body 1101 and one or more notches 1102 that are configured to receive one or more respective gussets (e.g., ribs 1002) that extend from a sidewall 1001 of a cell carrier 310 for battery cells 120. For example, the cross member 1100 may be configured to absorb an impact force distributed from respective gussets. For example, the notches 1102 of the cross member 1100 may include a first set of notches 1102 spaced apart along a first elongate edge 1103 of the elongate main body 1101. The notches 1102 of the cross member 1100 may also include a second set of notches 1102 spaced apart along a second elongate edge 1105 of the elongate main body 1101.

As shown in FIG. 3, second set of notches 1102 may be configured to receive a second set of respective gussets (e.g., ribs 1002) that extend from a sidewall 1001 of a second cell carrier 310 for battery cells. The cross member may be formed from a material including a metal (e.g., an aluminum, or aluminum alloy such as aluminum a380). As shown, the cross member 1100 may also include an one or more attachment features 1107 configured for securing the cross member 1100 in position relative to the cell carrier(s) 310.

As illustrated by FIGS. 1A, 1B, 3, 4, and 10, in one or more implementations, a battery pack 110 may include a battery module 115 that may include a first cell carrier 310 configured to receive a first set of battery cells 120, in which the first cell carrier 310 includes a first sidewall 1001 having a first set of ribs 1002 that extend outward from an exterior of the first sidewall 1001; and a second cell carrier 310 stacked with the first cell carrier 310 and configured to receive a second set of battery cells 120, in which the second cell carrier includes a second sidewall 1001, substantially coplanar with the first sidewall 1001 of the first cell carrier 310, and having a second set of ribs 1002 that extend outward from an exterior of the second sidewall 1001. In this configuration, the first set of ribs 1002 and the second set of ribs 1002 may be configured to distribute at least a portion of an impact force on the battery module 115 away from the first plurality of battery cells or the second plurality of battery cells.

In one or more implementations, the battery pack 110 may also include a cross member 1100 that includes an elongate main body 1101 and a first set of notches 1102 that are configured to receive the first set of ribs 1002 that extend from the first sidewall 1001 of the first cell carrier 310. The first set of notches 1102 may also be configured to receive the second set of ribs 1002 that extend from the second sidewall 1001 of the second cell carrier 310 that is stacked with the first cell carrier 310 in the battery module. In one or more implementations, the cross member 1100 may also include a second set of notches 1102 that are configured to receive a third set of ribs 1002 that extend from a third sidewall of a third cell carrier 310 (e.g., as in the example of FIG. 11). For example, the third cell carrier 310 may be a cell carrier of another battery module that is laterally offset with respect to the battery module that includes the first and second cell carriers. The cross member 1100 may be configured to absorb a first part of the impact force distributed from the first plurality of ribs and a second part of the impact force distributed from the second plurality of ribs.

In one or more implementations, a battery pack 110 may include a first cell carrier 310 for battery cells 120 and a second cell carrier 310 for the battery cells 120, in which the first cell carrier 310 includes a first set of ribs 1002 extending from a first sidewall 1001 of the first cell carrier 310, and in which the second cell carrier 310 includes a second set of ribs 1002 extending from a second sidewall 1001 of the second cell carrier 310; and a cross member 1100 disposed between the first cell carrier 310 and the second cell carrier 310, the cross member 1100 having a first set of notches 1102 on a first edge 1103 of the cross member that receive the first set of ribs and 1002 and a second set of notches 1102 on a second edge 1105 of the cross member that receive the second set of ribs 1002.

In one or more implementations, a method is provided that includes obtaining a first cell carrier 310 for battery cells 120 and a second cell carrier 310 for the battery cells 120. The first cell carrier may include a first set of ribs 1002 extending from a first sidewall 1001 of the first cell carrier 310, and the second cell carrier 310 may include a second set of ribs 1002 extending from a second sidewall 1001 of the second cell carrier 310. The method may also include arranging the first cell carrier 310 and the second cell carrier 310 such that the first set of ribs 1002 extend toward the second set of ribs 1002 (e.g., as in the example of FIG. 11). The method may also include providing a cross member 1100 between the first cell carrier 310 and the second cell carrier 310, such that a first set of notches 1102 on a first edge 1103 of the cross member receive the first set of ribs 1002 and a second set of notches 1102 on a second edge 1105 of the cross member 1100 receive the second set of ribs 1002. One or more battery cells 120 may be disposed within the first cell carrier 310 and/or the second cell carrier 310.

In one or more implementations, a method is provided that includes receiving an impact to a body of a vehicle 100 that includes a battery pack 110 that includes a cell carrier 310 having a set of gussets (e.g., ribs 1002) that extend from a sidewall 1001 thereof; and distributing, by the set of gussets, at least a portion of a force of the impact away from a set of battery cells 120 in the cell carrier 310 and to a cross member 1100 having a set of notches 1102 in which the set of gussets are disposed.

Figure 12:
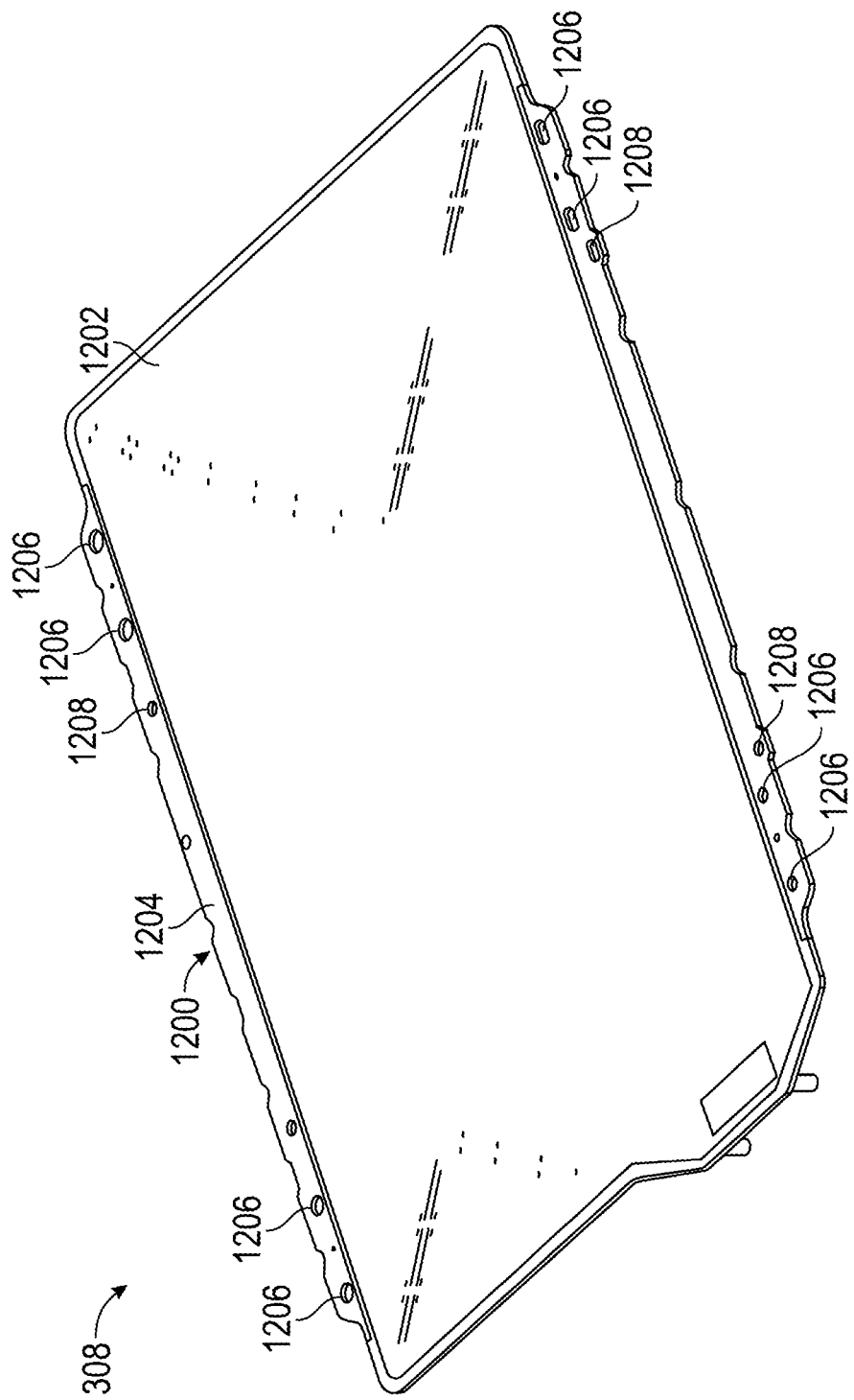
FIG. 12 illustrates a top perspective view of a cold plate for a battery module in accordance with one or more implementations.

FIG. 12 illustrates a top perspective view of a thermal component (e.g., a cold plate) for a battery module in accordance with one or more implementations. As shown in FIG. 12, the cold plate 308 may include a plate assembly 1200. The plate assembly 1200 may include a flange 1204 along one or more edges thereof. In one or more implementations, one or more locating features 1206 (e.g., for a cell carrier 310) and/or one or more locating (e.g., datuming) features 1208 may be formed along the flange 1204. In one or more implementations, a thermally conductive material 1202 (e.g., a thermally conductive adhesive) may be formed on a substantially planar outer surface of the plate assembly 1200. In one or more other implementations, the thermally conductive adhesive may be multi-part acrylic paste. In the example of FIG. 12, the thermally conductive material 1202 can be seen on one side of the cold plate 308, for thermally coupling to the battery cells 120 of a first submodule (the bottom submodule 306). In one or more implementations, the thermally conductive material 1202 may also be disposed on the other side of the cold plate 308 that is not visible in FIG. 12, for thermally coupling to the battery cells 120 of a second submodule (the top submodule 304).

Figure 13:
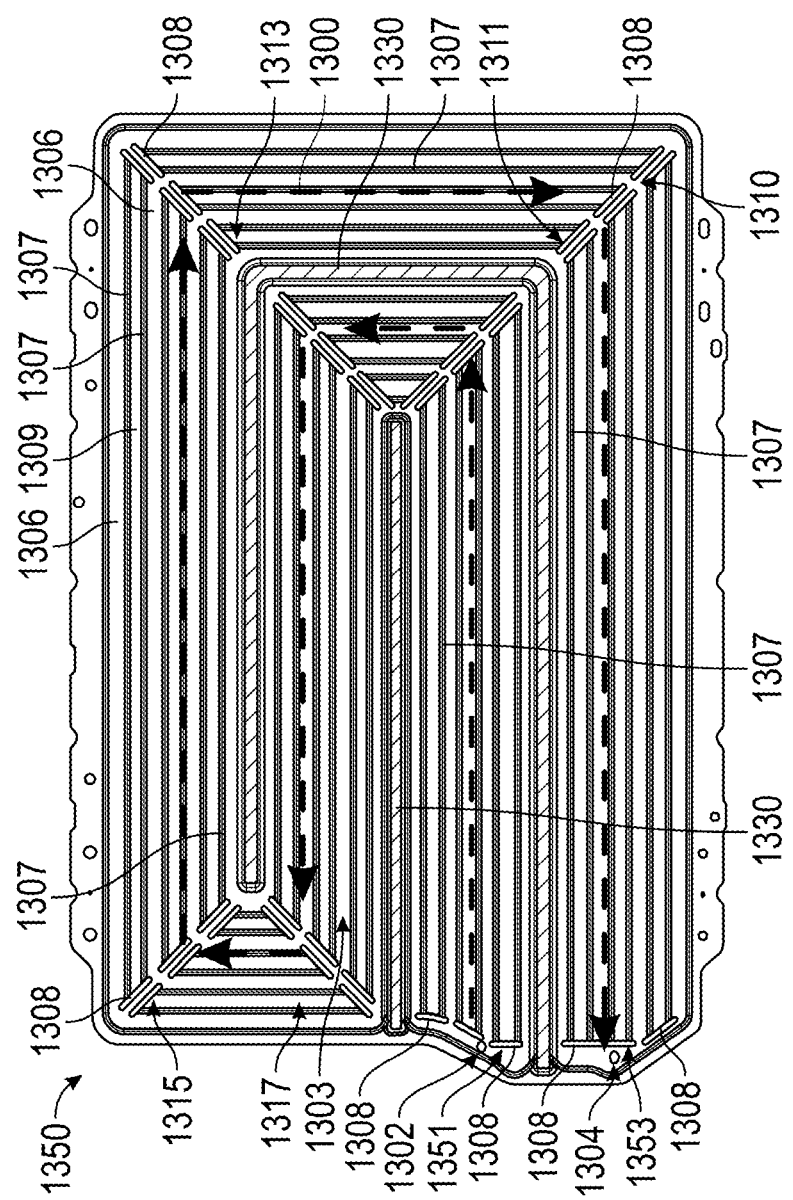
FIG. 13 illustrates a top view of a portion of a cold plate for a battery module in accordance with one or more implementations.

FIG. 13 illustrates a top view of a portion of a thermal component (e.g., a cold plate) for a battery module in accordance with one or more implementations. For example, FIG. 13 illustrates a middle plate 1350 of a plate assembly 1200 having a top plate (not visible in FIG. 13), a bottom plate (not visible in FIG. 13), and a middle plate disposed between the top plate and the bottom plate. As shown in FIG. 13, in one or more implementations, the middle plate 1350 may define a serpentine flow path 1300 for a fluid (e.g., a thermal fluid, such as a coolant fluid or a warming fluid) from an inlet port 1302 to an outlet port 1304. For example, the serpentine flow path 1300 may define and/or be defined within a plane. For example, the cold plate 308 may include one or more structural features 1307 that extend across (e.g., through) the serpentine flow path (e.g., across, or through, the plane). For example, the structural features 1307 may increase a burst pressure threshold of the cold plate. The structural features 1307 may prevent compression of the cold plate by external forces and/or may prevent swelling of the cold plate due to fluid pressure within the cold plate.

The structural features 1307 may separate some portions of the serpentine flow path 1300 from some other portions of the serpentine flow path 1300. For example, the plurality of structural features 1307 may separate a plurality of sub-channels 1306 that are partially defined by the structural features 1307. As shown, the sub-channels 1306 may define the serpentine flow path 1300 on a first side 1303 of the middle plate 1350 (e.g., the side of the middle plate 1350 that is visible in FIG. 13). As shown, multiple sub-channels 1306 may combine to form each of several segments of the serpentine flow path 1300. For example, the segments may include linear segments that run between turns or corners of the serpentine flow path 1300.

In one or more implementations, the sub-channels 1306 within each segment of the serpentine flow path 1300 may be separated from each other by the structural feature 1307 along the length of the segment, and may be fluidly coupled together at or near the ends of each segment. As shown, each segment of the serpentine flow path 1300 (e.g., each including multiple sub-channels 1306) may be fluidly separated from an adjacent, parallel segment of the serpentine flow path 1300, by a fluid barrier 1330 that at least partially defines the serpentine flow path 1300.

In one or more implementations, the structural features 1307 may each extend from a floor of a corresponding sub-channel 1306 to a respective ridge 1309. As discussed in further detail hereinafter, each ridge 1309 may form an additional sub-channel of an additional serpentine flow path on an opposing second side of the plate (not visible in FIG. 13). As shown, the structural features 1307 may include structural features formed in segments, including first segments that extend from the inlet port 1302 to a first central portion of the middle plate 1350, segments that extend perpendicularly to the first segments from the first central portion to a second central portion of the middle plate 1350, third segments that extend perpendicularly to the first segments and parallel to the first segments from the second central portion to a first edge portion of the middle plate 1350, fourth segments that extend perpendicularly to the third segments from the first edge portion to a first corner of the middle plate 1350, fifth segments that extend perpendicularly to the fourth segments and parallel to the third segments from the first corner of the middle plate 1350 to a second corner of the middle plate 1350, sixth segments that extend perpendicularly to the fifth segments from the second corner to a third corner of the middle plate 1350, and seventh segments that extend perpendicularly to the sixth segments from the third corner of the middle plate 1350 to the outlet port 1304. As shown in FIG. 13, the middle plate 1350 may include one or more openings 1308. As shown, the first, second, third, fourth, fifth, sixth, and seventh segments of the structural features 1307 may be separated from each other by a gap at which one or more of the openings 1308 are formed. Openings 1308 may be configured to allow a cooling fluid to flow through the middle plate 1350 (e.g., between the serpentine flow path 1300 on the first side of the plate and an additional serpentine flow path on the opposing second side of the middle plate 1350). In this way, cooling fluid that is flowing through the serpentine flow path 1300 can cross to an opposite side of the middle plate 1350, and vice versa. In one or more implementations, the openings 1308 may be configured (e.g., sized, shaped, and/or positioned) to generate a turbulence in a flow of the fluid through the serpentine flow path 1300. For example, the turbulence may increase a heat transfer efficiency of the fluid (e.g., to the top plate and the bottom plate).

As shown in FIG. 13, a first set 1311 of the openings 1308 may be arranged in a first row that extends from a first corner of the cold plate diagonally away from first and second edges of the cold plate that define the first corner. For example, the first set 1311 of the openings 1308 may be located at a turn (e.g., a corner) in the serpentine flow path 1300 (e.g., to increase the amount of mixing across the middle plate 1350 and/or to increase an amount of turbulence in the cooling fluid flowing through the serpentine flow path 1300). As shown, a second set 1313 of the openings 1308 may be arranged in a second row that extends, from a second corner of the cold plate toward an inner end of the first row and diagonally away from the second edge and a third edge of the cold plate that define the second corner (e.g., at another turn or corner in the serpentine flow path 1300).

As shown, a third set 1315 of the openings 1308 may be arranged in a third row that extends from a third corner of the cold plate diagonally away from the third edge and a fourth edge of the cold plate that define the third corner (e.g., at yet another turn or corner in the serpentine flow path 1300). As shown, a fourth set 1317 of the openings 1308 may be arranged in a fourth row that extends from a location along the fourth edge of the cold plate toward an inner end of the third row (e.g., at still another turn or corner in the serpentine flow path 1300). In one or more implementations, the middle plate 1350 may include one or more openings 1308 (e.g., one or more rows of openings 1308) at each corner or turn of the serpentine flow path 1300. In one or more implementations, the middle plate 1350 may include a row of openings 1308 at the beginning of each linear segment of the serpentine flow path 1300 and a row of openings 1308 at the end of each linear segment of the serpentine flow path 1300. In one or more implementations, the row of openings 1308 at the beginning of each linear segment of the serpentine flow path 1300 may be parallel to the row of openings 1308 at the end of a next linear segment of the serpentine flow path 1300 (e.g., such that each row of openings 1308 forms a row of parallel pairs of openings). In the example of FIG. 13, the openings 1308 each form a slot (e.g., an elongated narrow opening) in the middle plate 1350. In one or more other implementations, one or more of the openings 1308 may have one or more other shapes, different from the slot shape shown in FIG. 13.

In the example of FIG. 13, the serpentine flow path 1300 includes four sub-channels 1306 (e.g., separated by three ridges 1309) that each traverse the entire serpentine flow path 1300 and that are fluidly coupled together at each turn or corner (e.g., at the end of each linear segment) of the serpentine flow path 1300. However, this is merely illustrative and, in other implementations, the serpentine flow path 1300 may include fewer or more than four sub-channels 1306 (e.g., separated by fewer or more than three ridges 1309) that each traverse some or all of the entire serpentine flow path 1300 and that may be fluidly separate or fluidly coupled together at one or more turns or corners or other locations along the serpentine flow path 1300.

As shown, the openings 1308 may include openings 1308 that are located away from the inlet port 1302 and the outlet port 1304, and may include a fifth set 1351 of openings 1308 at or near the inlet port 1302. For example, by providing the openings 1308 at or near the inlet port 1302, a portion the cooling fluid that is introduced into the cold plate 308 via the inlet port 1302 on a first side of the middle plate 1350 can immediately cross (e.g., through the openings 1308 at or near the inlet port 1302) to the other side of the middle plate 1350. In this way, the openings 1308 at or near the inlet port 1302 may facilitate a concurrent initiation of flow of the cooling fluid (e.g., upon introduction into the cold plate 308 via the inlet port 1302 and before the cooling fluid travels to the end of the serpentine flow path 1300 on the first side of the plate) through a first serpentine flow path (e.g., serpentine flow path 1300) on a first side 1303 of the middle plate 1350 and a second serpentine flow path (e.g., a second serpentine flow path that mirrors the serpentine flow path 1300) on an opposing second side of the middle plate 1350. In this way, the thermal control provided by the cold plate 308 may be provided sooner, and thus more efficiently, to the battery cells 120 on both sides of the cold plate 308 (e.g., in the top submodule 304 and the bottom submodule 306), which may facilitate more efficient and/or more reliable power delivery from the battery cells 120. As shown, the middle plate 1350 may also include a sixth set 1353 of the openings 1308 at or near the outlet port 1304.

Figure 14:
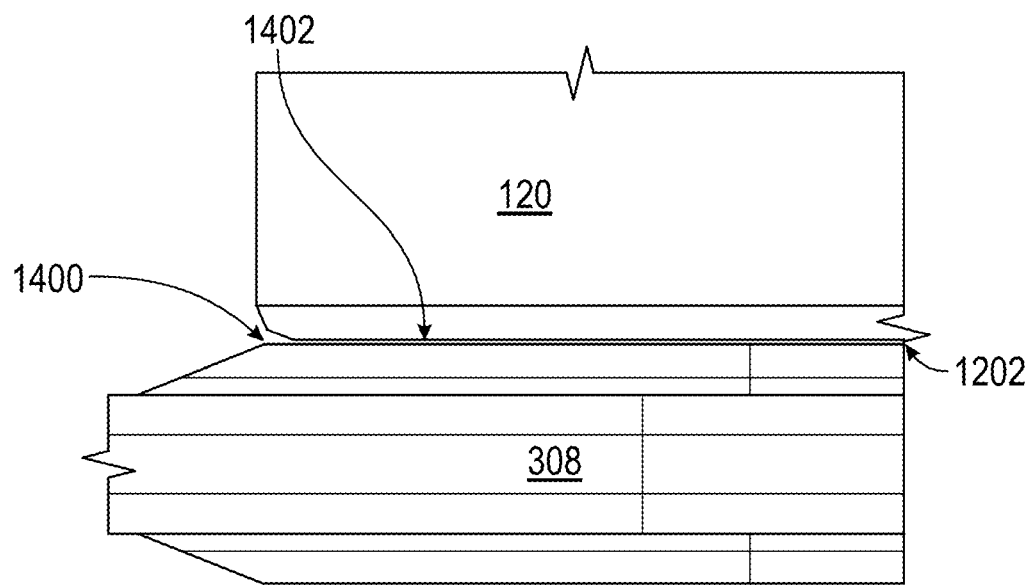
FIG. 14 illustrates a side view of a portion of a cold plate attached to a battery cell in accordance with one or more implementations.

FIG. 14 illustrates a side view of a portion of the cold plate 308 to which a battery cell 120 is attached, in accordance with one or more implementations. For example, the thermally conductive material 1202 may include an adhesive that attaches a bottom end of a battery cell 120 to the cold plate 308. In the example of FIG. 14, the battery cell 120 may be an outermost battery cell of a group of battery cells (e.g., in a battery sub-assembly, such as the top submodule 304 or the bottom submodule 306 described herein). As shown, the battery cell 120 (e.g., the bottom surface of the battery cell 120) may each be disposed within an outer boundary of 1400 a thermal contact surface 1402 of the cold plate 308 (e.g., the outer edge of an outermost battery cell 120 may be substantially aligned with the outer boundary 1400 of the thermal contact surface 1402). For example, the thermal contact surface 1402 may be the outer surface of the thermally conductive material 1202 (e.g., a thermally conductive adhesive). In this way, the entire bottom surface of each battery cell 120 may be in thermal contact with the cold plate 308 (e.g., with the thermally conductive material 1202), which can prevent or avoid reduced thermal control for the outer rows/columns of battery cells 120 in a battery subassembly).

Figure 15:
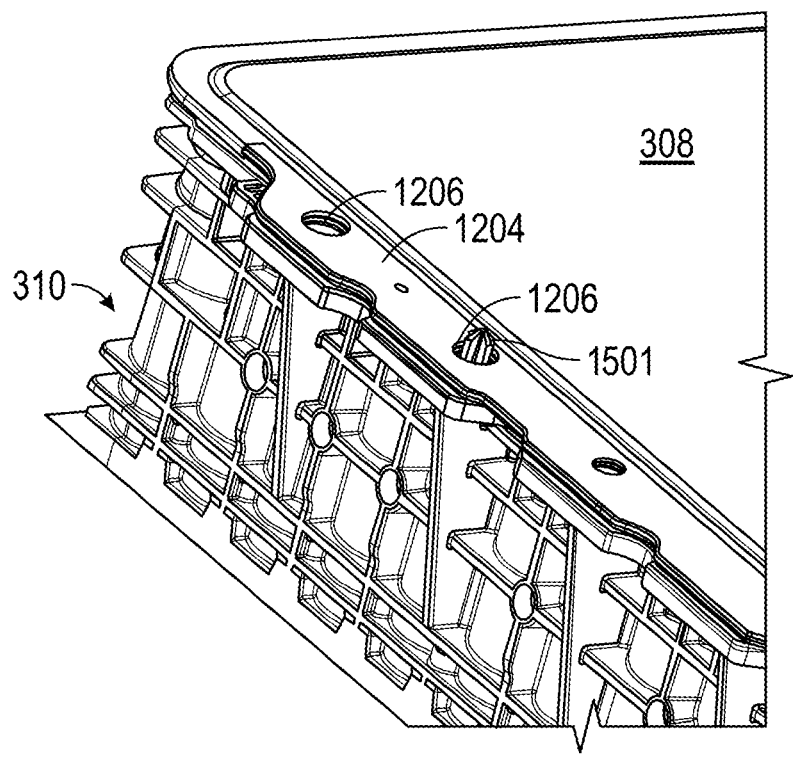
FIG. 15 illustrates a perspective bottom view of a partially assembled battery module having a cold plate with locating features in accordance with one or more implementations.

FIG. 15 illustrates a perspective bottom view of a partially assembled battery module 115 having a cold plate 308 with locating features 1206 in accordance with one or more implementations. As shown, the locating features 1206 may include openings that receive a pin 1501 or other protrusion on a cell carrier 310 (e.g., a cell carrier 310 of the top submodule 304 or the bottom submodule 306 described herein). In the example of FIG. 15, the pin 1501 of the cell carrier 310 is received in an inboard locating feature 1206 of two locating features 1206. Although not shown in FIG. 15, another cell carrier 310, oriented oppositely to the orientation of the cell carrier 310 that is shown in FIG. 15 (e.g., a cell carrier 310 of the other of the top submodule 304 or the bottom submodule 306 described herein), may have a locating pin that is received in the outboard locating feature 1206. In this way, the locating features 1206 of the cold plate 308 may be used to locate the top submodule 304 and the bottom submodule 306 of the battery module 115 to the cold plate 308.

Figure 16:
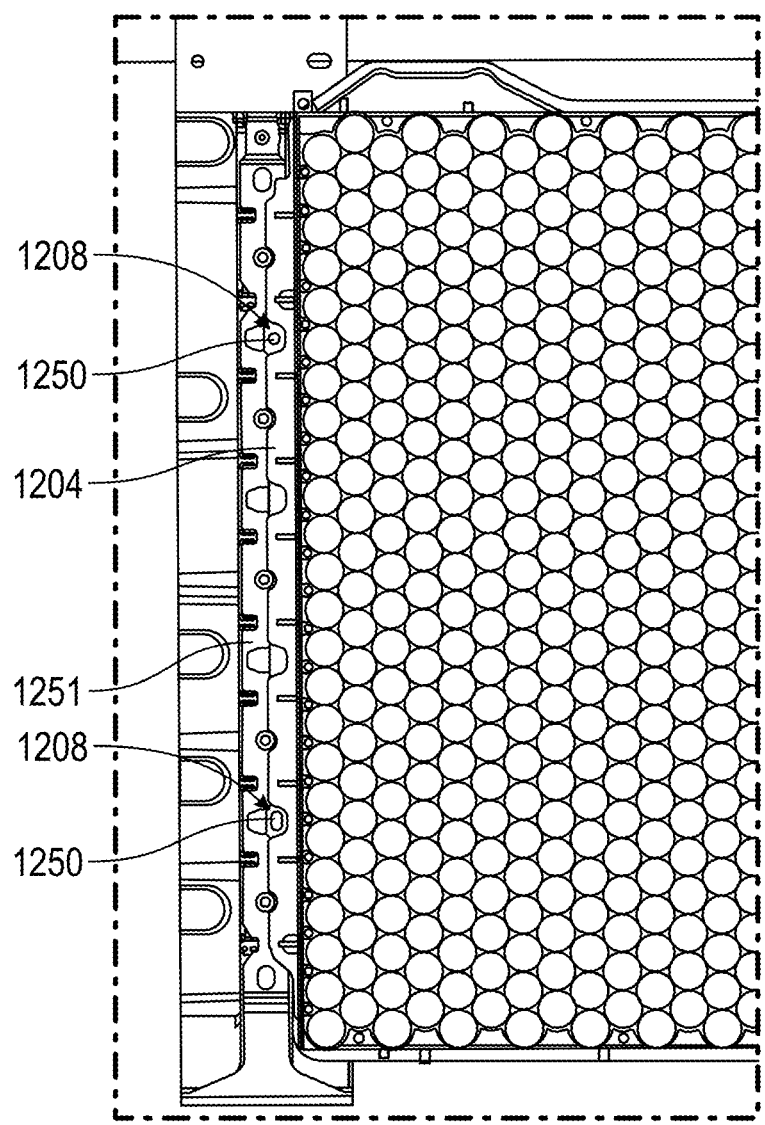
FIG. 16 illustrates a top view of a cold plate having locating features in accordance with one or more implementations.

FIG. 16 illustrates a top view of the cold plate 308 showing how locating features 1208 (e.g., datuming features) may be used to locate the cold plate 308 (and/or a battery module 115 or other battery subassembly within which the cold plate 308 is disposed) relative to one or more battery pack structures. For example, locating features 1208 (e.g., datuming features) may be used to locate the cold plate 308 (and/or a battery module 115 or other battery subassembly within which the cold plate 308 is disposed) relative to a cross member 1251 that extends between battery modules 115 within a battery pack 110. As shown, the locating features 1208 may include openings or notches that allow positioning equipment (e.g., a camera or other sensor of positioning equipment that can lift and/or move the cold plate 308 and/or the battery module 115 within which the cold plate 308 is disposed) to view one or more locating features 1250 on the cross member 1100 or another battery pack structure. For example, positioning equipment that includes a camera or other sensor may lift a battery module 115 that includes a cold plate 308, and may track the location of the locating features 1250 relative to the locating features 1208 while placing the battery module containing the cold plate 308 in position relative to the cross member 1251 (e.g., for attachment to the cross member 1251 and/or other battery pack structures).

Figure 17:
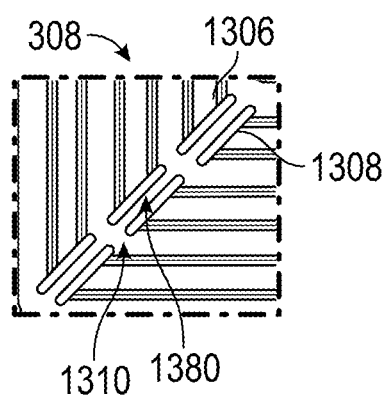
FIG. 17 illustrates a top view of a portion of a cold plate having support structures in accordance with one or more implementations.

As illustrated by, for example, FIGS. 12, 15 and 16, in one or more implementations, the cold plate 308 includes a flange 1204 that extends along an edge of the cold plate 308, outside of the serpentine flow path 1300. The flange may include one or more locating features 1206 for attaching the cold plate to one or more cell carriers 310 for a battery module 115. In one or more implementation (e.g., as shown in FIGS. 3 and 4), the cold plate 308 may be disposed between two groups of battery cells, such as between a pair of battery modules (e.g., a top submodule 304 and a bottom submodule 306 of a battery module 115) in an electric vehicle (e.g., vehicle 100). FIG. 17 illustrates a top view of a portion of the cold plate 308 showing how the openings 1308 may be separated by a gap 1310 and a gap 1380 in one or more implementations.

Figure 18:
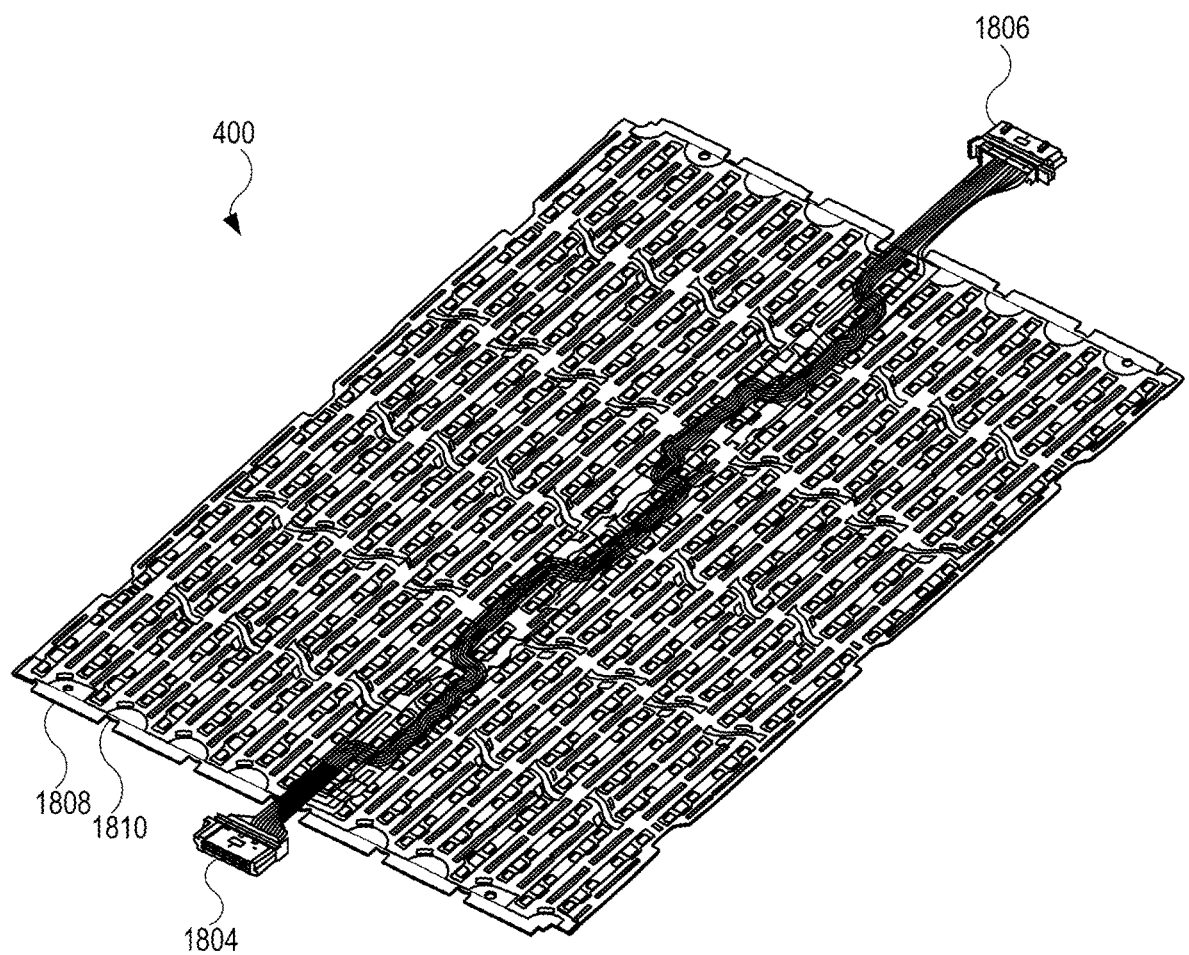
FIG. 18 illustrates a perspective view of a current collector assembly (CCA) for a battery module in accordance with one or more implementations.

FIG. 18 illustrates a perspective view of a current collector assembly for a battery module in accordance with one or more implementations. As shown in FIG. 18, the CCA 400 may include one or more tabs 1800, one or more interconnecting structures 1802, a connector 1804, a connector 1806, one or more edge portions 1808, and one or more notches 1810 (e.g., strain relief notches) in each of the edge portions.

Figure 19A:
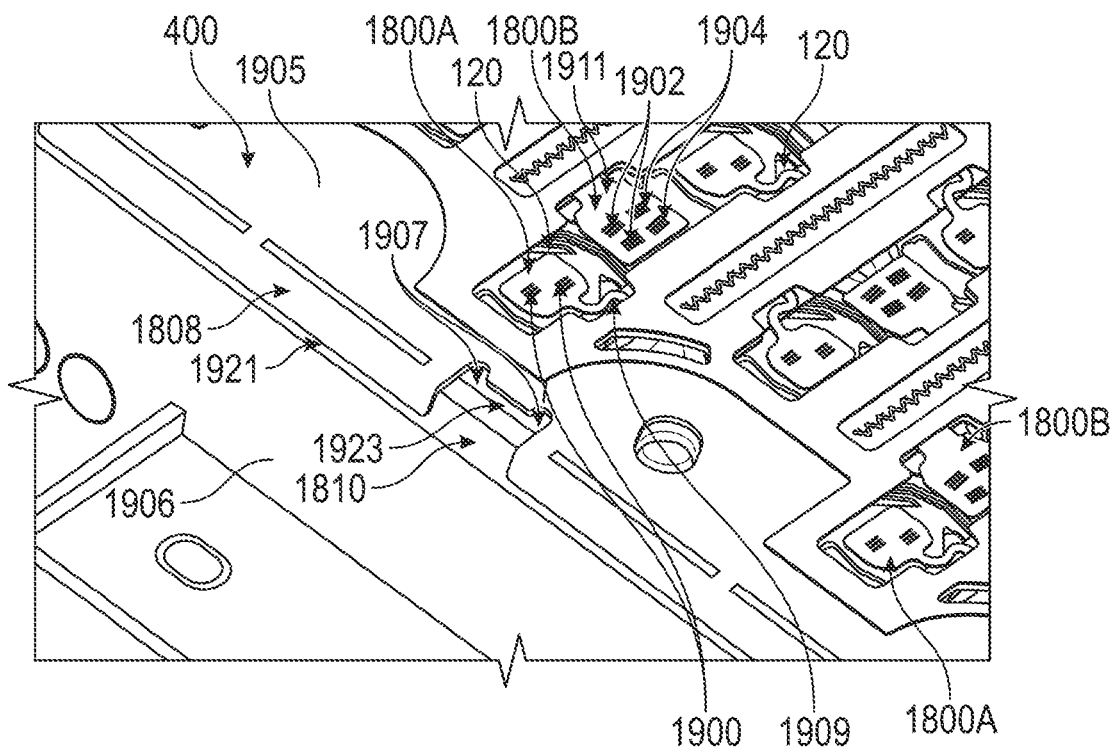
FIG. 19A illustrates a perspective view of a portion of a current collector assembly (CCA) for a battery module in accordance with one or more implementations.

FIG. 19A illustrates a perspective view of a portion of the current collector assembly (CCA) 400 of FIG. 18. As shown in FIG. 19A, a current collector assembly 400 for a battery module 115 may include an electrically conductive layer 1905, a first tab 1800A extending from the electrically conductive layer 1905, and a second tab 1800B extending from the electrically conductive layer 1905. For example, the electrically conductive layer 1905 may electrically interconnect the tabs 1800A (e.g., to electrically interconnect the positive terminals of the battery cells), and may electrically interconnect the tabs 1800B (e.g., to electrically interconnect the negative terminals of the battery cells). As shown, the first tab 1800A may be configured to be welded, by a first plurality of (e.g., parallel) welds 1900 to a positive terminal of a first battery cell 120. The second tab 1800B may be configured to be welded, by a second plurality of (e.g., parallel) welds 1902, to a negative terminal of the first battery cell 120 and, by a third plurality of (e.g., parallel) welds 1904, to a negative terminal of a second battery cell 120. As shown in FIG. 19A, the first tab 1800A may have a substantially rectilinear shape. As shown in FIG. 19A, the second tab 1800B may have a substantially rectilinear shape. In this way, the first tab 1800A may be provided with sufficient surface area for at least one additional plurality of (e.g., parallel) welds in addition to the first plurality of (e.g., parallel) welds, and/or the second tab 1800B may be provided with sufficient surface area for at least one additional plurality of (e.g., parallel) welds in addition to the second plurality of (e.g., parallel) welds and the third plurality of (e.g., parallel) welds.

As illustrated in FIG. 19A, the current collector assembly 400 may include a plurality of the first tabs 1800A including the first tab 1800A and a plurality of second tabs 1800B including the second tab 1800B. As shown, each of the plurality of first tabs 1800A may be electrically and mechanically coupled to the electrically conductive layer 1905 by a respective first flexible conductive connector 1909, and each of the plurality of second tabs 1800B may be electrically and mechanically coupled to the electrically conductive layer 1905 by a respective second flexible conductive connector 1911. As shown, the first tab 1800A and the second tab 1800B may each be disposed in a cutout in the electrically conductive layer 1905.

In one or more implementations, a battery module 115 may include a first battery cell 120 and a second battery cell 120; and a current collector assembly 400. The current collector assembly 400 may include an electrically conductive layer 1905, a first tab 1800A extending from the electrically conductive layer 1905, and a second tab 1800B extending from the electrically conductive layer 1905. The first tab may be welded, by a first plurality of (e.g., parallel) welds 1900 to a positive terminal of the first battery cell 120, and the second tab may be welded, by a second plurality of (e.g., parallel) welds 1902, to a negative terminal of the first battery cell 120 and, by a third plurality of (e.g., parallel) welds 1904, to a negative terminal of the second battery cell. In one or more implementations, the battery module 115 may also include a third battery cell 120 and a fourth battery cell 120 mounted in an orientation that is substantially opposite to an orientation of the first battery cell 120 and the second battery cell 120; and an additional current collector assembly 400. The additional current collector assembly 400 may include an additional electrically conductive layer 1905, a third tab 1800A extending from the additional electrically conductive layer 1905, and a fourth tab 1800B extending from the additional electrically conductive layer 1905. The third tab 1800A may be welded, by a fourth plurality of (e.g., parallel) welds 1900 to a positive terminal of the third battery cell 120, and the fourth tab 1800B may be welded, by a fifth plurality of (e.g., parallel) welds 1902, to a negative terminal of the fourth battery cell 120 and, by a sixth plurality of (e.g., parallel) welds 1904, to a negative terminal of the third battery cell 120.

In one or more implementations, an electric vehicle (e.g., vehicle 100) may include a current collector assembly 400, in which the current collector assembly 400 includes an electrically conductive layer 1905, a plurality of first tabs 1800A extending from the electrically conductive layer 1905, and a plurality of second tabs 1800B extending from the electrically conductive layer 1905. Each first tab may be welded, by a first plurality of (e.g., parallel) welds 1900 to a positive terminal of a first battery cell 120 of a corresponding pair of battery cells 120, and each second tab may be welded, by a second plurality of (e.g., parallel) welds 1902, to a negative terminal of the first battery cell 120 and, by a third plurality of (e.g., parallel) welds 1904, to a negative terminal of a second battery cell 120 of the corresponding pair of battery cells 120.

In one or more implementations, a method may be provided that includes providing a plurality of battery cells 120, each having a positive terminal and a negative terminal at a first end thereof; aligning a first plurality of tabs 1800A of a current collector assembly 400 with the positive terminals of the plurality of battery cells 120 and a second plurality of tabs 1800B of the current collector assembly 400 with the negative terminals of the plurality of battery cells 120; forming a first plurality of (e.g., parallel) welds 1900 on each of the first plurality of tabs 1800A to connect the first plurality of tabs 1800A, respectively, to the positive terminals of the plurality of battery cells 120; and forming a second plurality of (e.g., parallel) welds 1902 on each of the second plurality of tabs 1800B to connect one of the negative terminals of one of the plurality of battery cells 120 to that second tab 1800B and a third plurality of (e.g., parallel) welds 1904 on each of the second plurality of tabs 1800B to connect one of the negative terminals of another one of the plurality of battery cells 120 to that second tab.

As discussed herein, the edge portion 1808 of the electrically conductive layer 1905 of the CCA 400 may be provided with one or more notches 1810. As shown in FIG. 19A, in one or more implementations, the at least one notch 1810 may include a first extension 1907 in a first corner of the notch 1810 and a second extension 1907 in a second corner of the notch 1810. As shown in FIG. 19A, the notch 1810 may be configured to extend from an outer edge 1921 of the electrically conductive layer to a location beyond an interior edge 1923 of the electrical structure 1906 when the edge portion 1808 is bent over an welded to the electrical structure 1906.

Figure 19B:
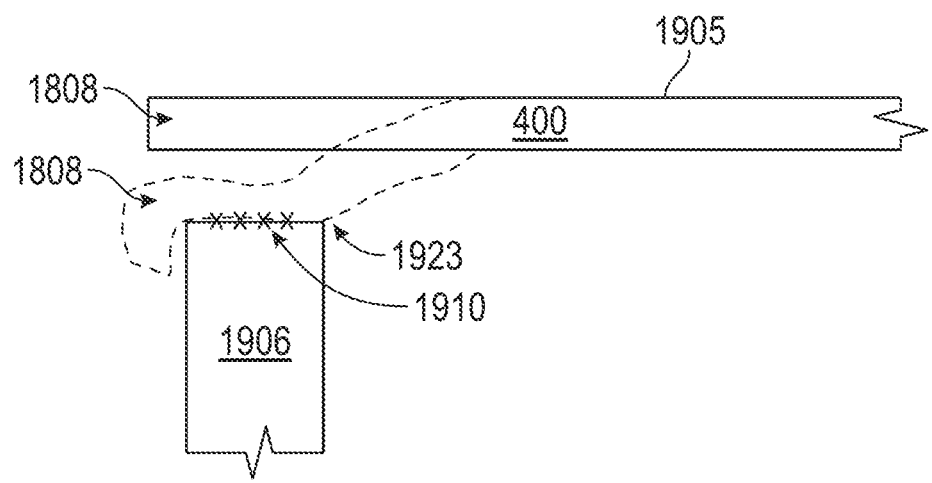
FIG. 19B illustrates an edge portion of an electrically conductive layer of a current collector assembly of a battery module bent over a portion of a busbar for the battery module in accordance with one or more implementations.

As illustrated in FIG. 19A, the notches 1810 may facilitate bending of the edge portion 1808. For example, a current collector assembly 400 for a battery module 115 may include an electrically conductive layer 1905 having an edge portion 1808 that is configured to be bent over and welded to an electrical structure 1906. For example, the electrical structure 1906 may be a busbar, such as the busbar 320, the busbar 322, or the series busbar 406 described herein. In one or more implementations, at least one notch 1810 in the edge portion 1808 facilitates bending of the edge portion 1808 over the electrical structure 1906. For example, FIG. 19B illustrates an edge portion 1808 of an electrically conductive layer 1905 of a current collector assembly 400 that is bent over a portion of the electrical structure 1906. For example, as illustrated in FIG. 19B, the electrically conductive layer 1905 may be provided in a substantially planar configuration, and the edge portion(s) 1808 (e.g., on either side of the notches) may then be bent into contact and/or over the edge of the electrical structure 1906 (e.g., in a clamping process), and attached to the electrical structure 1906 using welds 1910 (e.g., edge welds, such as using laser welds). Providing the strain relief notches (e.g., notches 1810) that allow the edge portion(s) 1808 to be bent toward the electrical structure 1906 for formation of welds 1910 may improve the welds 1910, which may improve the structural reliability of the battery module 115, and may improve the current carrying performance of the CCA 400, which can enhance the charging performance of a battery subassembly, battery module 115, and/or battery module 110. For example, improving the welds 1910 as described can increase the rate at which the battery cells 120 can be charged (e.g., by as much as or more than several minutes).

Figure 20:
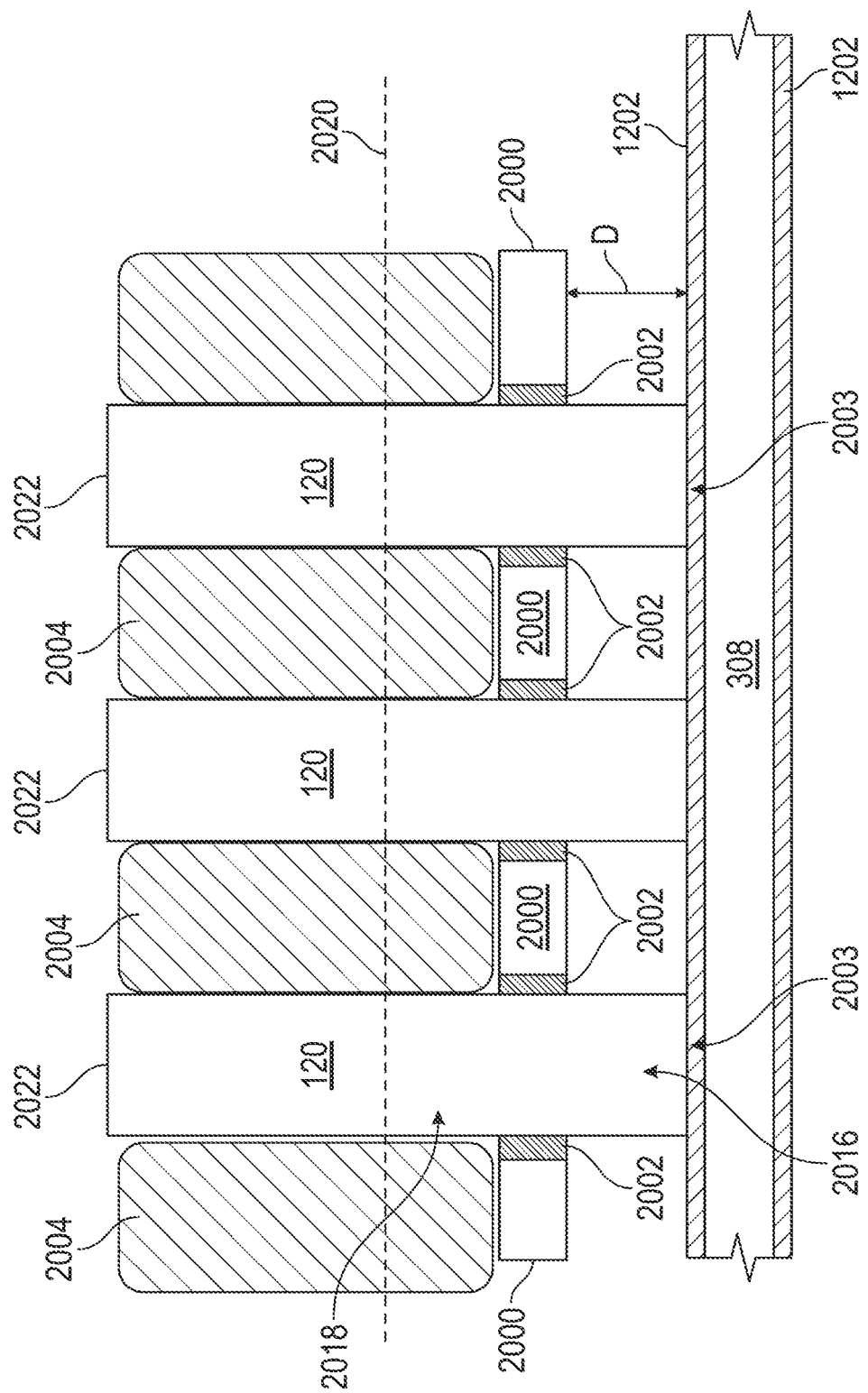
FIG. 20 illustrates a cross-sectional side view of a portion of a battery module including a cell carrier and a cold plate in accordance with one or more implementations.

FIG. 20 illustrates a cross-sectional side view of a portion of a battery module including a cell carrier and a cold plate in accordance with one or more implementations. In the example of FIG. 20, a cell carrier 310 for a plurality of battery cells 120 includes a portion (e.g., a crate structure 2000) that defines an arrangement (e.g., an array) of a plurality of openings, each configured to receive a battery cell 120. As shown, the portion of the cell carrier 310 may be configured to secure a lower portion of each battery cell 120 within a corresponding one of the openings, to allow an upper portion of each battery cell 120 to be contacted by a potting material 2004 (e.g., a foaming or syntactic potting material) that extends between (e.g., and substantially fills the space between) adjacent battery cells 120 and extends from a top height (e.g., at a top 2022) of the battery cells 120 to the portion of the cell carrier (e.g., to the crate structure 2000). In one or more implementations, the crate structure 2000 may be an integral portion of the unitary structure that includes the sidewalls 1001, the flange 1000, and the ribs 1002 described herein (e.g., in connection with FIG. 10).

As shown in FIG. 20, a first adhesive 2002 may attach the crate structure 2000 to the battery cells 120. For example, the first adhesive may be formed, in part, by a polyurethane, such as a two-part polyurethane system. In one or more implementations, the potting material 2004 may also be formed from the same polyurethane or a similar polyurethane (e.g., and a plurality of micro-balloons). In this way, the first adhesive 2002 may provide a low viscosity adhesive to join the battery cells 120 to the cell carrier 310, and may be compatible with the polyurethane potting system of the potting material 2004.

As shown in FIG. 20, the cold plate 308 may be provided with a second adhesive (e.g., thermally conductive material 1202), different from the first adhesive 2002, that attaches a bottom surface (e.g., bottom 2003) of each of the battery cells 120 to the cold plate 308. For example, the second adhesive may be a thermally conductive adhesive corresponding to the thermally conductive material 1202. For example, the second adhesive may be implemented as a conductive adhesive transfer tape or a double-sided adhesive tape that substantially covers a surface of the cold plate. For example, a double-sided conductive adhesive tape may be sized and cut to the cold plate dimensions underneath the cells, and then stuck onto the cold plate 308 with a release liner. As shown in FIG. 20, cold plate 308 may be provided with a layer of the thermally conductive adhesive tape on each side thereof (e.g., for attaching the inversely oriented battery cells 120 of the top submodule 304 and the bottom submodule 306 of a battery module 115). Providing a double-sided conductive adhesive tape may reduce or eliminate a powder coating that may otherwise be provided on an aluminum cold plate. For example, powder coatings are sometimes used as an isolation barrier, and reducing or eliminating the need for a powder coating may save cost, complexity, and manufacturing cycle time and/or reduce health and safety risks in manufacturing.

In one or more implementations, the lower portion 2016 of each battery cell 120 may include a portion of the battery cell that extends from a bottom 2003 of the battery cell 120 to a location less than halfway 2020 to a top 2022 of the battery cell 120. For example, the lower portion 2016 of each battery cell may include a portion of the battery cell 120 that extends from a bottom of the battery cell to a location less than a quarter of a distance to a top 2022 of the battery cell 120. For example, a battery cell 120 may have a height of, e.g., between 25 and 200 millimeters (mm), and the crate structure 2000 may be located at a height, D, (e.g., from the bottom of the battery cells 120 or from a bottom of the cell carrier 310) of less than 20 mm, less than 10 mm or less than 5 mm, in one or more implementations.

In one or more implementations, a battery subassembly, such as a battery module 115, may include a cell carrier 310 for a plurality of battery cells 120, in which the cell carrier 310 includes a crate structure 2000 having a plurality of openings, each configured to receive a battery cell 120. The crate structure 2000 may be configured to secure a lower portion 2016 of each battery cell 120 to allow an upper portion 2018 of each battery cell 120 to be contacted by a potting material 2004 that extends between adjacent battery cells and from a top height of the battery cells to the crate structure 2000. The battery module 115 may also include the plurality of battery cells 120, each having the lower portion 2016 thereof secured to the crate structure 2000 by a first adhesive 2002. The potting material 2004 may extend between adjacent battery cells 120 and from a top height of the battery cells 120 (e.g., at the top 2022) to the crate structure 2000.

In one or more implementations, an electric vehicle (e.g., vehicle 100) is provided with a battery pack 110 that includes one or more battery subassemblies (e.g., battery modules 115), each of the one or more battery subassemblies including a cell carrier 310 for a plurality of battery cells 120, in which the cell carrier 310 includes a crate structure 2000 having a plurality of openings, each configured to receive a battery cell 120. The crate structure 2000 may be configured to secure a lower portion 2016 of each battery cell 120 to allow an upper portion 2018 of each battery cell 120 to be contacted by a potting material 2004 that extends between adjacent battery cells and from a top height of the battery cells to the crate structure 2000.

In one or more implementations, a method may be provided that includes inserting a plurality of battery cells 120 into a cell carrier 310; attaching a lower end (e.g., lower portion 2016) of each of the plurality of battery cells 120 into a portion of the cell carrier 310 (e.g., a crate structure 2000 of the cell carrier 310) using a first adhesive 2002; and providing a potting material 2004 into a plurality of spaces between the battery cells 120 of the plurality of battery cells 120 such that the potting material contacts the battery cells 120 and the portion of the cell carrier (e.g., as shown in FIG. 20). The method may also include attaching a cold plate 308 to a bottom 2003 of each of the plurality of battery cells 120 using a second adhesive (e.g., thermally conductive material 1202) different from the first adhesive 2002.

Various examples are described herein in which a cell carrier 310 is provided with sidewall structures, such as ribs 1002, which may be configured to distribute at least a portion of an impact force on the cell carrier 310 (e.g., due to an impact to the battery pack 110, such as due to a vehicle collision) away from the battery cells carried by the cell carrier 310. In, for example, the examples of FIGS. 3 and 10, the ribs 1002 of a cell carrier 310 may be implemented as gussets that extend perpendicularly from the sidewall 1001 to the flange 1000 that extends outward from a base of the sidewall 1001 perpendicularly to the sidewall 1001 and to each of the ribs 1002.

Figure 21:
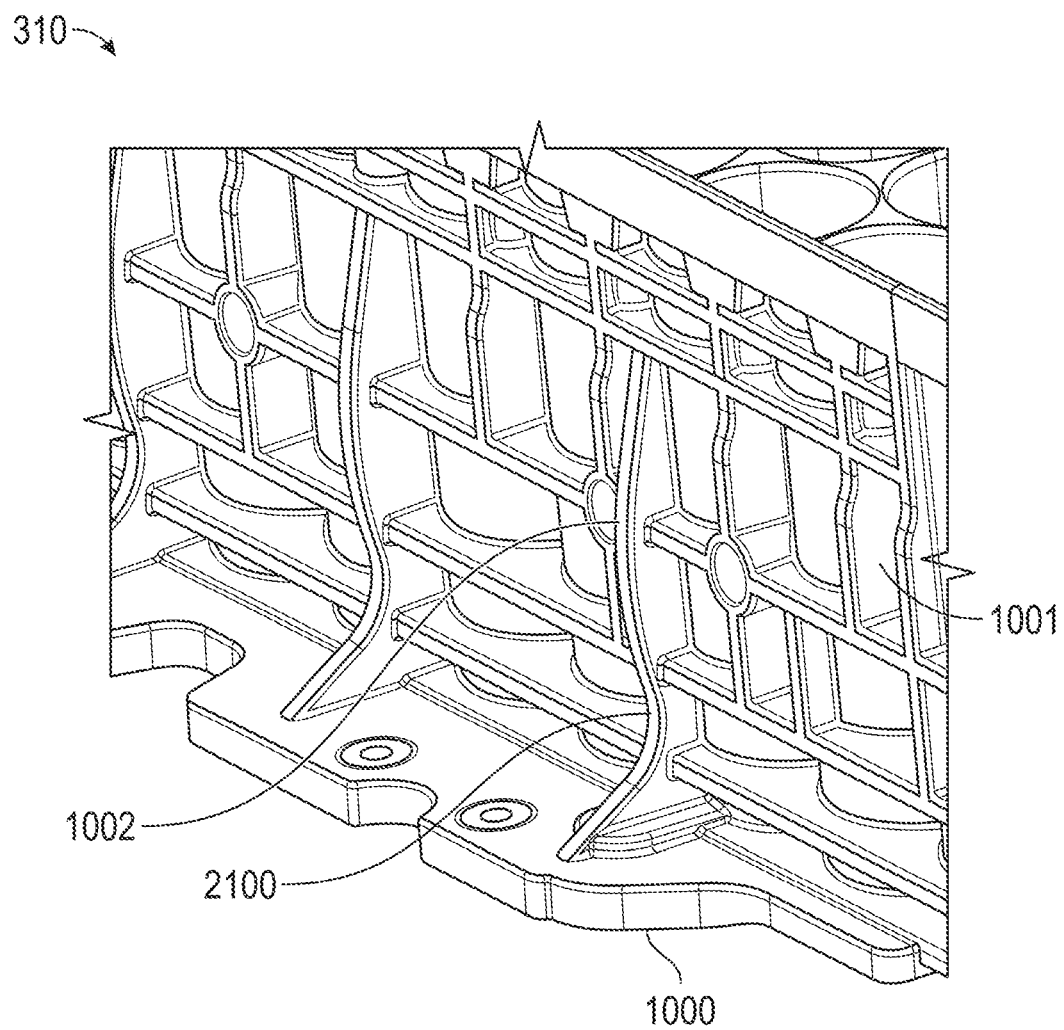
FIG. 21 illustrates a perspective view of a portion of a cell carrier in accordance with one or more implementations.

In, for example, the examples of FIGS. 3 and 10, each of the ribs 1002 extends from a corresponding sidewall 1001 to a first distance at a corresponding flange 1000, and linearly tapers, moving vertically away from the corresponding flange 1000, toward the corresponding sidewall 1001. However, in one or more other implementations, the ribs 1002 may have a different outer profile from the linear taper that is shown in FIGS. 3 and 10. For example, FIG. 21 illustrates an implementation of the cell carrier 310 in which at least some of the ribs 1002 have a curved outer profile. In this example, the curved outer profile may include a portion that tapers (e.g., non-linearly) away from the sidewall 1001, and a concave portion 2100 having a first section thereof that tapers (e.g., non-linearly) back toward the sidewall 1001 and a second section thereof that tapers (e.g., non-linearly) away from the sidewall 1001 to the flange 1000. Providing the concave portion 2100 on the rib 1002 may help to reduce the stress experienced by the rib 1002 and/or the flange 1000 during assembly of the battery module 115 into the battery pack 110 (e.g., including insertion of the ribs 1002 into the notches 1102 in the cross member 1100). For example, the concave portion 2100 may allow the ribs to flex during assembly, which may help to prevent cracking or breaking of the ribs and/or other portions of the cell carrier.

Figure 22:
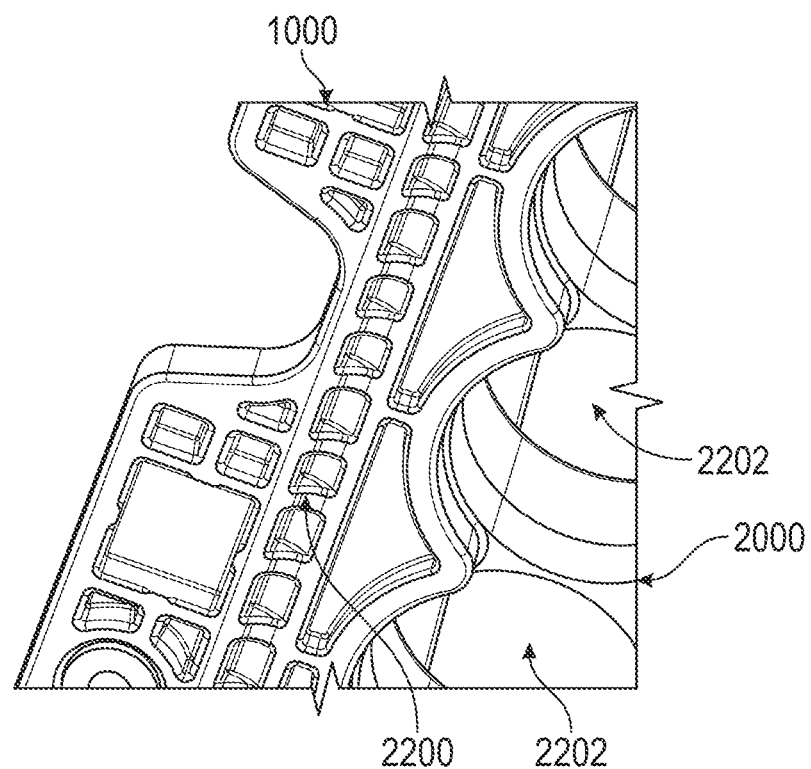
FIG. 22 illustrates a bottom perspective view of a portion of a flange of a cell carrier in accordance with one or more implementations.
Figure 23:
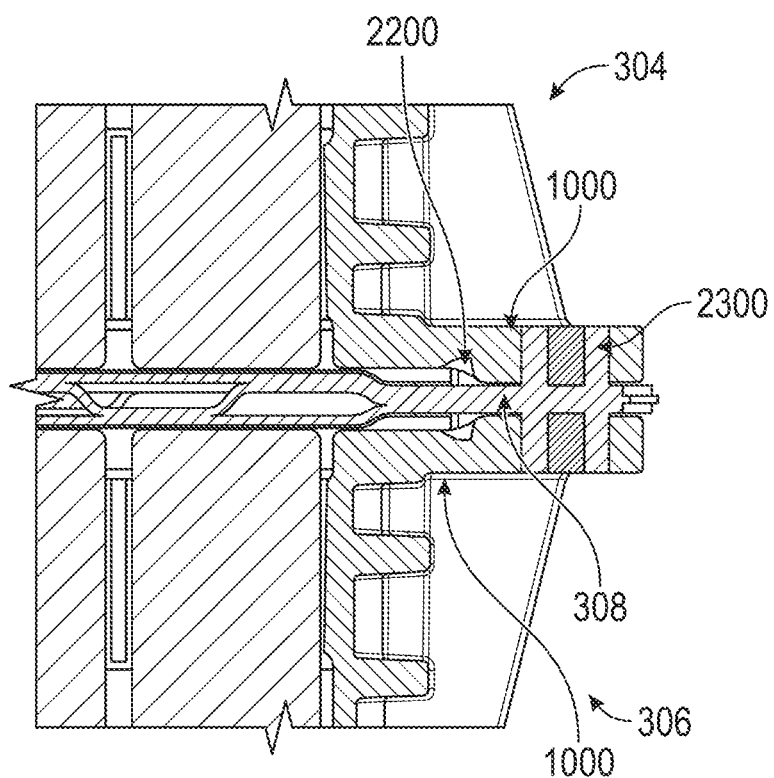
FIG. 23 illustrates a cross-sectional side view of a portion of a battery module in accordance with one or more implementations.

FIG. 22 illustrates a portion of a cell carrier having a flange 1000. In the example of FIG. 3, a portion of the crate structure 2000 (e.g., discussed herein in connection with FIG. 20) is also visible, with openings 2202 for receiving the battery cells 120. For example, the openings 2202 may be provided with the adhesive 2002 as discussed above in connection with FIG. 20. As shown in FIG. 22, in one or more implementations, the flange 1000 may also have ribbing 2200 (e.g., on a bottom surface thereof, such as a bottom surface that is configured to interface with the cold plate 308). For example, FIG. 23 illustrates a cross-sectional side view of a portion of a battery module 115 in which a flange 1000 of a cell carrier of a top submodule 304 and a flange 1000 of a cell carrier of a bottom submodule 306 are mounted in contact with the cold plate 308 (e.g., on opposing top and bottom sides of the flange 1204 of the cold plate 308, in one or more implementations). The ribbing 2200 on the bottom surface of the flange 1000 may reduce the stress experienced by the flange 1000 and/or the ribs 1002 during assembly of the battery module 115 into the battery pack 110. For example, the ribbing 2200 may allow the flange 1000 to flex during assembly, which may help to prevent cracking or breaking of the flange, the ribs, and/or other portions of the cell carrier. FIG. 23 also shows how the cold plate 308 may be provided with a compression limiter 2300. The compression limiter 2300 may have a height that extends (e.g., entirely) from a top of an opening in the flange 1000 of the top submodule 304 to the bottom or an opening in the flange 1000 in the bottom submodule 306. In this way, the compression limiter 2300 may act as gap filler to help provide a uniform distribution of load on the module flange 1000.

Figure 24:
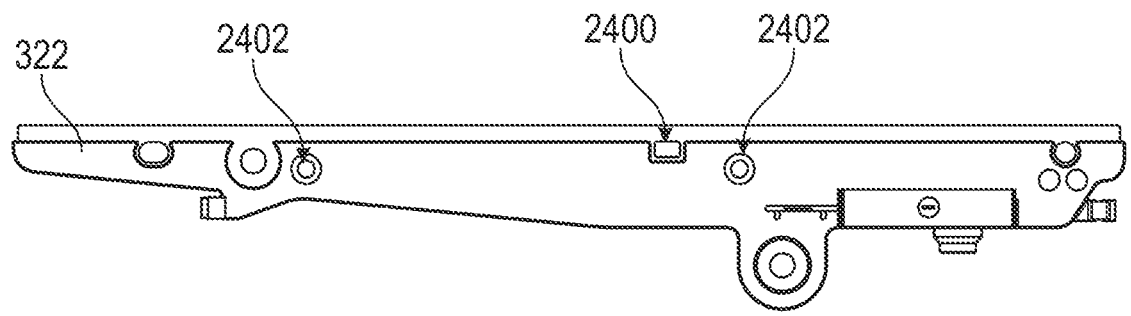
FIG. 24 illustrates a side view of a busbar in accordance with one or more implementations.
Figure 25:
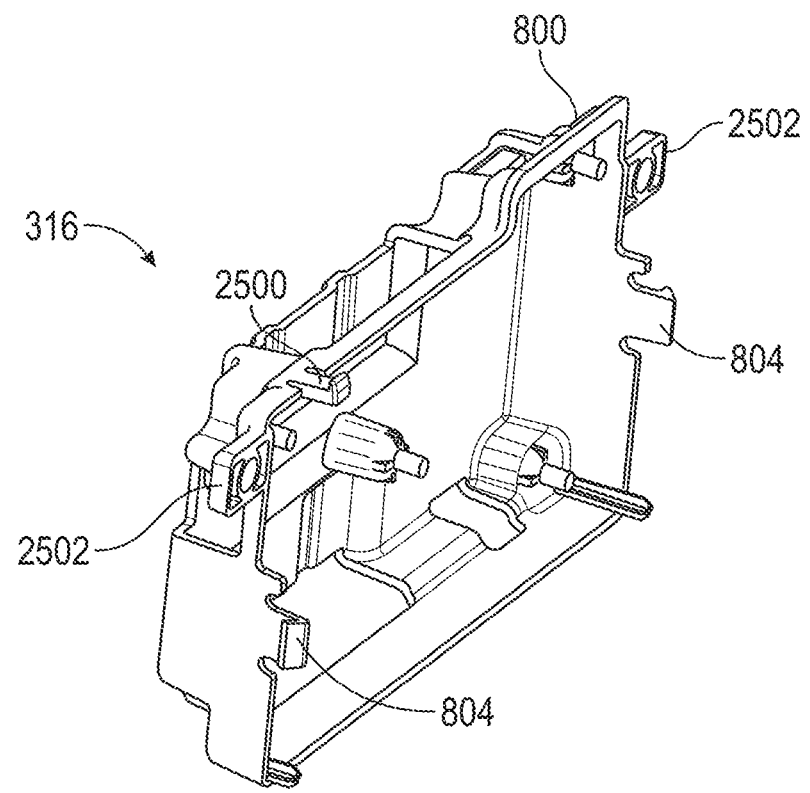
FIG. 25 illustrates a perspective view of a housing for a balancing voltage and temperature (BVT) module for a battery module in accordance with one or more implementations.

During operation of a vehicle, shocks and/or vibration loads can affect the mounting of certain vehicle components (e.g., particularly in use cases in which the vehicle is used for off-road travel). For example, BVT rattling and/or BVT interface wear, relative to other module components, can be caused by the movements of the vehicle in some use cases. If the BVT is not sufficiently retained in place, this can impart a stress and/or strain on, for example, a flex harness for the connector 1804 of the connector 1806 of the CCA 400. Stress and/or strain on a flex harness can cause damage to weld traces therein and/or loss of p-string voltage. Loss of p-string voltage during vehicle operation can, in some use cases, result in a vehicle being placed in a safe state or otherwise becoming (e.g., temporarily) unusable. In one or more implementations, a battery module or other battery subassembly may be provided with additional mounting and/or retention features for a BVT. For example, FIG. 24 illustrates an example of a busbar 322 that may be provided with mounting features for a BVT module 316. As shown, the busbar 322 may be provided with a notch 2400 and/or one or more holes 2402. FIG. 25 illustrates an implementation of the housing 800 of a BVT module 316 that may be mounted, at least in part, to the busbar 322 of FIG. 24. As shown in FIG. 25, in addition to the mounting features 804 (e.g., which may snap into corresponding features in the cell carrier 310), the housing 800 may be provided with a snap feature 2500 that is configured to be received by the notch 2400 in the busbar 322 of FIG. 24. As shown, the housing 800 of the BVT module 316 may also include one or more extensions 2502. As shown, the extensions 2502 may have holes that are configured to align with the holes 2402 on the busbar 322, to allow a fastener (e.g., a push pin) to pass through the extensions 2502 and the holes 2402 to further secure the BVT module 316 to the cell carrier. In the example of FIG. 25, the housing 800 includes snap features at the two outer edges thereof, a snap features at a top thereof, and extensions for receiving push pins at the tops of the outer edges thereof. In various other implementations, vertical ribs on a busbar overmold may be provided, one or more additional pin features may be provided (e.g., along the top or the bottom of the housing 800), and/or one or more additional snap features may be provided (e.g., along the bottom of the housing 800). Providing additional mounting and/or retention features for the BVT module 316 (e.g., as in the examples of FIGS. 24 and 25) may help to prevent movement of the BVT module 316 relative to other portions of the battery module 115 during operation of a vehicle, which may also help to dampen the vibration and flex of a voltage sensing harness (VSH), which may include the connectors 1804 and/or 1806. Reduction in VSH flex may result in reduced strain and/or stress on the traces therein, and thereby reduce the risk of a p-string voltage loss. Robust retention mechanisms, as in the examples of FIGS. 24 and 25, may reduce and/or eliminate instances of service of the BVT and/or VSH, thereby reducing field repair costs and resources, and/or improving the reliability of an electric vehicle. By providing the mounting/retention features of FIGS. 24 and 25, a commonization strategy may be provided that applies to different vehicle programs. In the example of FIGS. 24 and 25, the busbar 322 is provided with additional retention features (e.g., push pin holes) that may act as a backup retention feature (e.g., in the case of a BVT snap breaking during handling/installation) thereby reducing scrap and/or improve production yield to enable high volume production.

Aspects of the subject technology can help improve the efficiency and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
    a cell carrier for a plurality of battery cells,
    wherein the cell carrier comprises a portion that defines an arrangement of a plurality of openings, each configured to receive a battery cell,
    wherein the portion of cell carrier is configured to secure a lower portion of each battery cell within a corresponding one of the openings, to allow an upper portion of each battery cell to be contacted by a potting material that extends between adjacent battery cells and from a top height of the battery cells to the portion of the cell carrier;
    a first adhesive on a sidewall of each of the plurality of openings, wherein the first adhesive on the sidewall of each of the plurality of openings is configured to attach that sidewall to a sidewall of one of the plurality of battery cells, wherein the first adhesive is different from, and compatible with, the potting material;
    a cold plate; and
    a second adhesive, different from the first adhesive, wherein the lower portion of each battery cell is configured to extend beyond the first adhesive into contact with the second adhesive, and wherein the second adhesive attaches a bottom surface of each of the battery cells to the cold plate.

2. The apparatus of claim 1, wherein the second adhesive comprises an acrylic paste.

3. The apparatus of claim 2, wherein the first adhesive prevents the potting material from flowing into contact with the lower portion of each of the battery cells.

4. The apparatus of claim 1, wherein the second adhesive comprises a thermally conductive adhesive.

5. The apparatus of claim 1, wherein the second adhesive comprises a double-sided adhesive tape that substantially covers a surface of the cold plate.

6. The apparatus of claim 5, wherein the lower portion of each battery cell comprises a portion of the battery cell that extends from a bottom of the battery cell to a location less than halfway to a top of the battery cell.

7. The apparatus of claim 1, wherein the lower portion of each battery cell comprises a portion of the battery cell that extends from a bottom of the battery cell to a location less than a quarter of a distance to a top of the battery cell.

8. The apparatus of claim 1, wherein the portion of the cell carrier comprises a crate structure of the cell carrier.

9. An apparatus, comprising:
a battery subassembly, the battery subassembly comprising:
a cell carrier for a plurality of battery cells, wherein the cell carrier comprises a crate structure having a plurality of openings, each configured to receive a battery cell,
wherein the crate structure is configured to secure a lower portion of each battery cell to allow an upper portion of each battery cell to be contacted by a potting material that extends between adjacent battery cells and from a top height of the battery cells to the crate structure;
a first adhesive on a sidewall of each of the plurality of openings, wherein the first adhesive on the sidewall of each of the plurality of openings is configured to attach that sidewall to a sidewall of one of the plurality of battery cells, wherein the first adhesive is different from, and compatible with, the potting material;
a cold plate; and
a second adhesive, different from the first adhesive, wherein the lower portion of each battery cell is configured to extend beyond the first adhesive into contact with the second adhesive, and wherein the second adhesive attaches a bottom surface of each of the battery cells to the cold plate.

10. The apparatus of claim 9, the battery subassembly further comprising the plurality of battery cells each having the lower portion thereof secured to the crate structure by the first adhesive.

11. The apparatus of claim 10, the battery subassembly further comprising the potting material extending between adjacent battery cells and from a top height of the battery cells to the crate structure.

12. The apparatus of claim 10, wherein the first adhesive comprises a polyurethane and wherein the potting material that is different from the first adhesive comprises the polyurethane or another polyurethane, for compatibility with the first adhesive.

13. The apparatus of claim 12, wherein the first adhesive and the crate structure prevents the potting material from flowing into contact with the lower portion of each of the battery cells.

14. The apparatus of claim 9, wherein the apparatus comprises a vehicle comprising the battery subassembly.

15. The apparatus of claim 14, wherein the vehicle comprises a battery pack comprising the battery subassembly and a plurality of additional battery subassemblies.

16. The apparatus of claim 1, wherein the sidewall of each battery cell comprises:
a first portion corresponding to the upper portion of that battery cell,
a second portion attached to the sidewall of a corresponding one of the plurality of openings in the cell carrier by the first adhesive, and
a third portion corresponding to the lower portion of that battery cell, wherein the second portion is between the first portion and the third portion, and wherein the third portion extends beyond the sidewall of the corresponding one of the plurality of openings in the cell carrier and is free of the first adhesive and the potting material.

17. The apparatus of claim 1, wherein the cell carrier further comprises a flange that extends around the portion of the cell carrier that defines the arrangement of the plurality of openings, wherein the flange is mounted in contact with the cold plate.

18. The apparatus of claim 17, wherein the flange comprises:
ribbing that allows the flange to flex, and
at least one opening, wherein the cold plate comprises a compression limiter disposed within the at least one opening of the flange.

* * * * *